(12) United States Patent
Omuro et al.

(10) Patent No.: US 12,459,488 B2
(45) Date of Patent: *Nov. 4, 2025

(54) DRIVE APPARATUS FOR VEHICLE

(71) Applicant: TOYOTA JIDOSHA KABUSHIKI KAISHA, Toyota (JP)

(72) Inventors: Keisuke Omuro, Toyota (JP); Atsushi Tabata, Okazaki (JP); Koichi Okuda, Toyota (JP); Yohei Habata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 185 days.

This patent is subject to a terminal disclaimer.

(21) Appl. No.: 18/316,282

(22) Filed: May 12, 2023

(65) Prior Publication Data

US 2023/0373460 A1    Nov. 23, 2023

(30) Foreign Application Priority Data

May 17, 2022   (JP) ................. 2022-081166

(51) Int. Cl.
*B60W 20/10* (2016.01)
*B60K 6/52* (2007.10)
(Continued)

(52) U.S. Cl.
CPC .............. *B60W 20/10* (2013.01); *B60K 6/52* (2013.01); *B60K 17/02* (2013.01); *B60K 17/348* (2013.01);
(Continued)

(58) Field of Classification Search
CPC ...... B60W 20/10; B60W 10/02; B60W 10/06; B60W 10/08; B60K 6/52; B60K 17/02;
(Continued)

(56) References Cited

U.S. PATENT DOCUMENTS 11,912,125 B2 *  2/2024  Omuro .............. B60K 23/0808
2004/0176203 A1   9/2004  Supina et al.
(Continued)

FOREIGN PATENT DOCUMENTS

JP         2021-131153 A        9/2021

OTHER PUBLICATIONS

Notie of Allowance dated Nov. 17, 2023, issued in U.S. Appl. No. 18/316,296 (U.S. Pat. No. 11,912,125).

*Primary Examiner* — Brian P Sweeney
(74) *Attorney, Agent, or Firm* — Oblon, McClelland, Maier & Neustadt, L.L.P.

(57) ABSTRACT

A drive apparatus for vehicle including a first power source, a first output rotating member, a second output rotating member, a second power source, a differential device, a first engagement device, a second engagement device, and a control device. The control device establishing, as drive modes driving a vehicle, a first drive mode putting the vehicle in all-wheel drive state by power from the second power source while fixing a torque distribution ratio between front wheels and rear wheels with both the first engagement device and the second engagement device kept in engaged state, and a second drive mode controlling the torque distribution ratio by putting the vehicle in all-wheel drive state by power from the first power source while controlling the second engagement device to be in slip state with the first engagement device kept in engaged state.

4 Claims, 19 Drawing Sheets

(51) Int. Cl.
  *B60K 17/02*    (2006.01)
  *B60K 17/348*   (2006.01)
  *B60K 17/356*   (2006.01)
  *B60W 10/02*    (2006.01)
  *B60W 10/06*    (2006.01)
  *B60W 10/08*    (2006.01)

(52) U.S. Cl.
  CPC ........... *B60K 17/356* (2013.01); *B60W 10/02* (2013.01); *B60W 10/06* (2013.01); *B60W 10/08* (2013.01); *B60Y 2200/92* (2013.01); *B60Y 2400/82* (2013.01)

(58) Field of Classification Search
  CPC .... B60K 17/348; B60K 17/356; B60K 6/387; B60K 2006/4825; B60K 6/48; B60K 17/3462; B60Y 2200/92; B60Y 2400/82; F16H 2200/0043; F16H 2200/2007; F16H 2200/2041; F16H 2200/2066; Y02T 10/62
  See application file for complete search history.

(56) References Cited

U.S. PATENT DOCUMENTS

2017/0136867 A1* 5/2017 Holmes .................... B60K 6/48
2021/0260995 A1  8/2021 Akiyama et al.

* cited by examiner

FIG.3

| AT GEAR STAGE | C1 | C2 | B1 | B2 | F1 |
|---|---|---|---|---|---|
| N、Rev | | | | | |
| 1st | ○ | | | △ | ○ |
| 2nd | ○ | | ○ | | |
| 3rd | ○ | ○ | | | |
| 4th | | ○ | ○ | | |

FIG.6

| NO. | MODE | BF1 | CF1 | CD1 |
|---|---|---|---|---|
| m1 | BEV(FF) HIGH | | ○ | |
| m2 | BEV(FF) LOW | ○ | | |
| m3 | BEV_LSD | | ○ | ○ SLIP CONTROL |
| m4 | BEV_Lock | | ○ | ○ |
| m5 | FIRST POWER SOURCE TORQUE SPLIT | | | ○ |
| m6 | FIRST POWER SOURCE LSD | | ○ SLIP CONTROL | ○ |
| m7 | FIRST POWER SOURCE Lock | | ○ | ○ |
| m8 | FIRST POWER SOURCE TWO-WHEEL DRIVE(FR) | | | |

FIG.13

| NO. | MODE | BF1 | CF1 | CD1 |
|---|---|---|---|---|
| m1 | BEV(FR) HIGH |  | O |  |
| m2 | BEV(FR) LOW | O |  |  |
| m3 | BEV_LSD |  | O | O SLIP CONTROL |
| m4 | BEV_Lock |  | O | O |
| m5 | FIRST POWER SOURCE TORQUE SPLIT |  |  | O |
| m6 | FIRST POWER SOURCE LSD |  | O SLIP CONTROL | O |
| m7 | FIRST POWER SOURCE Lock |  | O | O |
| m8 | FIRST POWER SOURCE TWO-WHEEL DRIVE(FR) |  |  |  |

FIG.16

| NO. | MODE | BF1 | CF1 | CD1 |
|---|---|---|---|---|
| m1 | BEV(FR) HIGH | | O | |
| m2 | BEV(FR) LOW | O | | |
| m3 | BEV_LSD | | O | O SLIP CONTROL |
| m4 | BEV_Lock | | O | O |
| m5 | FIRST POWER SOURCE TORQUE SPLIT | | | O |
| m6 | FIRST POWER SOURCE LSD | | O SLIP CONTROL | O |
| m7 | FIRST POWER SOURCE Lock | | O | O |
| m8 | FIRST POWER SOURCE TWO-WHEEL DRIVE(FF) | | | |

FIG.19

| NO. | MODE | BF1 | CF1 | CD1 |
|---|---|---|---|---|
| m1 | BEV(FF) HIGH | | O | |
| m2 | BEV(FF) LOW | O | | |
| m3 | BEV_LSD | | O | O SLIP CONTROL |
| m4 | BEV_Lock | | O | O |
| m5 | FIRST POWER SOURCE TORQUE SPLIT | | | O |
| m6 | FIRST POWER SOURCE LSD | | O SLIP CONTROL | O |
| m7 | FIRST POWER SOURCE Lock | | O | O |
| m8 | FIRST POWER SOURCE TWO-WHEEL DRIVE(FF) | | | |

DRIVE APPARATUS FOR VEHICLE

This application claims priority from Japanese Patent Application No. 2022-081166 filed on May 17, 2022, the disclosure of which is herein incorporated by reference in its entirety.

BACKGROUND OF THE INVENTION

Field of the Invention

The present invention relates to a drive apparatus for vehicle having a differential device that distributes torque to front wheels and rear wheels.

Description of the Related Art

A drive apparatus for vehicle is well known that includes: a first power source; a first output rotating member receiving power from the first power source and outputting power to one wheels of front wheels and rear wheels; a second output rotating member outputting power to the other wheels of the front wheels and the rear wheels; a second power source; a differential device having a first rotary element to which the second power source is connected, a second rotary element to which one of the first output rotating member and the second output rotating member is connected, and a third rotary element; a first engagement device selectively connecting the third rotary element and the other of the first output rotating member and the second output rotating member; a second engagement device selectively connecting any two of the first rotary element, the second rotary element, and the third rotary element, and a control device. An example thereof is a power transmission device described in JP2021131153A.

In the above drive apparatus for vehicle, it is conceived to establish, as drive modes driving a vehicle, a first drive mode controlling a torque distribution ratio between the front wheels and the rear wheels by putting the vehicle in all-wheel drive state by power from the second power source while controlling the first engagement device to be in slip state with the second engagement device kept in engaged state, and a second drive mode putting the vehicle in all-wheel drive state by power from the first power source while fixing the torque distribution ratio with both the first engagement device and the second engagement device kept in engaged state. By the way, in case of allowing the first drive mode and the second drive mode to be established as the drive modes in this manner, the power source driving the vehicle is switched between the second power source and the first power source when switching the drive mode between the first drive mode and the second drive mode. For that reason, the torque distribution ratio between the front wheels and the rear wheels may possibly change upon the power source switching. This may bring about deterioration in running stability.

SUMMARY OF THE INVENTION

In the above drive apparatus for vehicle, it is conceived to establish, as drive modes driving a vehicle, a first drive mode putting the vehicle in all-wheel drive state by power from the second power source while fixing a torque distribution ratio between the front wheels and the rear wheels with both the first engagement device and the second engagement device kept in engaged state, and a second drive mode controlling the torque distribution ratio by putting the vehicle in all-wheel drive state by power from the first power source while controlling the second engagement device to be in slip state with the first engagement device kept in engaged state. By the way, in case of allowing the first drive mode and the second drive mode to be established as the drive modes in this manner, the power source driving the vehicle is switched between the second power source and the first power source when switching the drive mode between the first drive mode and the second drive mode. For that reason, the torque distribution ratio between the front wheels and the rear wheels may possibly change upon the power source switching. This may bring about deterioration in running stability.

The object indicated above is achieved according to the following aspects of the present invention.

According to a first aspect of the invention, there is provided a drive apparatus for vehicle which comprises: a first power source; first output rotating member receiving power from the first power source and outputting power to one wheels of front wheels and rear wheels; second output rotating member outputting power to the other wheels of the front wheels and the rear wheels; second power source; differential device having a first rotary element to which the second power source is connected, a second rotary element to which one of the first output rotating member and the second output rotating member is connected, and a third rotary element; first engagement device selectively connecting the third rotary element and the other of the first output rotating member and the second output rotating member; second engagement device selectively connecting any two of the first rotary element, the second rotary element, and the third rotary element, and control device, the control device establishing, as drive modes driving a vehicle, a first drive mode putting the vehicle in all-wheel drive state by power from the second power source while fixing a torque distribution ratio between the front wheels and the rear wheels with both the first engagement device and the second engagement device kept in engaged state, and a second drive mode controlling the torque distribution ratio by putting the vehicle in all-wheel drive state by power from the first power source while controlling the second engagement device to be in slip state with the first engagement device kept in engaged state, when switching the drive mode from the first drive mode to the second drive mode, the second engagement device is switched from the engaged state to the slip state, while keeping the first engagement device engaged, after switching the power source from the second power source to the first power source.

According to a second aspect of the invention, in the drive apparatus for vehicle according to the first aspect of the invention, when switching the power source from the second power source to the first power source, the control device reduces torque of the second power source depending on increase in torque of the first power source.

According to a third aspect of the invention, there is provided a drive apparatus for vehicle which comprises: a first power source; a first output rotating member receiving power from the first power source and outputting power to one wheels of front wheels and rear wheels; a second output rotating member outputting power to the other wheels of the front wheels and the rear wheels; a second power source; a differential device having a first rotary element to which the second power source is connected, a second rotary element to which one of the first output rotating member and the second output rotating member is connected, and a third rotary element; a first engagement device selectively connecting the third rotary element and the other of the first output rotating member and the second output rotating member; a second engagement device selectively connecting any two of the first rotary element, the second rotary element, and the third rotary element, and a control device, the control device establishing, as drive modes driving a vehicle, a first drive mode putting the vehicle in all-wheel drive state by power from the second power source while fixing a torque distribution ratio between the front wheels and the rear wheels with both the first engagement device and the second engagement device kept in engaged state, and a second drive mode controlling the torque distribution ratio by putting the vehicle in all-wheel drive state by power from the first power source while controlling the second engagement device to be in slip state with the first engagement device kept in engaged state, when switching the drive mode from the second drive mode to first drive mode, the control device switches the power source driving the vehicle from the first power source to the second power source, after switching the second engagement device from slip state to the engaged state while keeping the first engagement device engaged.

According to a fourth aspect of the invention, in the drive apparatus for vehicle according to the third aspect of the invention, when switching the power source from the first power source to the second power source, the control device reduces torque of the first power source depending on increase in torque of the second power source.

According to the first aspect of the invention, when the drive mode is switched from the m4 mode to the m6 mode, the power source is switched with the torque distribution ratio fixed since the second engagement device is switched from the engaged state to the slip state while keeping the first engagement device engaged, after switching the power source from the second power source to the first power source. This prevents the torque distribution ratio from changing due to the power source switching. In consequence, deterioration in the running stability can be suppressed upon switching of the drive mode involving the power source switching.

According to the second aspect of the invention, since upon switching the power source from the second power source to the first power source, torque of the second power source is reduced depending on increase in torque of the first power source, drop in the drive torque due to power source switching can be suppressed.

According to the third aspect of the invention, when the drive mode is switched from the second drive mode to the first drive mode, the control device switches the power source driving the vehicle from the first power source to the second power source, after switching the second engagement device from slip state to the engaged state while keeping the first engagement device engaged, therefore the power source is switched with torque distribution ratio between the front wheels and the rear wheels fixed. This prevents the torque distribution ratio from changing due to the power source switching. In consequence, deterioration in the running stability can be suppressed upon switching of the drive mode involving the power source switching.

According to the fourth aspect of the invention, since upon switching the power source from the first power source to the second power source, torque of the first power source is reduced depending on increase in torque of the second power source, drop in the drive torque due to power source switching can be suppressed.

FIG. 3 is a table putting together the relationships between the gear stages of the automatic transmission in FIG. 2, and the operation of the engagement devices used therefor.

FIG. 6 is an operation engagement table explaining relationships between modes established in the transfer in FIG. 4 and the control states of the engagement devices in the transfer.

FIG. 7 shows their relationship, as well.

FIG. 10 shows an example different from the flowchart of FIG. 9.

FIG. 13 is an operation engagement table explaining relationships between modes established in the transfer in FIG. 11 and the control states of the engagement devices in the transfer.

FIG. 16 is an operation engagement table explaining relationships between modes established in the transfer in FIG. 14 and the control states of the engagement devices in the transfer.

FIG. 19 is an operation engagement table explaining relationships between modes established in the transfer in FIG. 17 and the control states of the engagement devices in the transfer.

DESCRIPTION OF THE PREFERRED EMBODIMENTS

Embodiments of the present invention will now be described in detail with reference to the accompanying drawings.

First Embodiment

Figure 1:
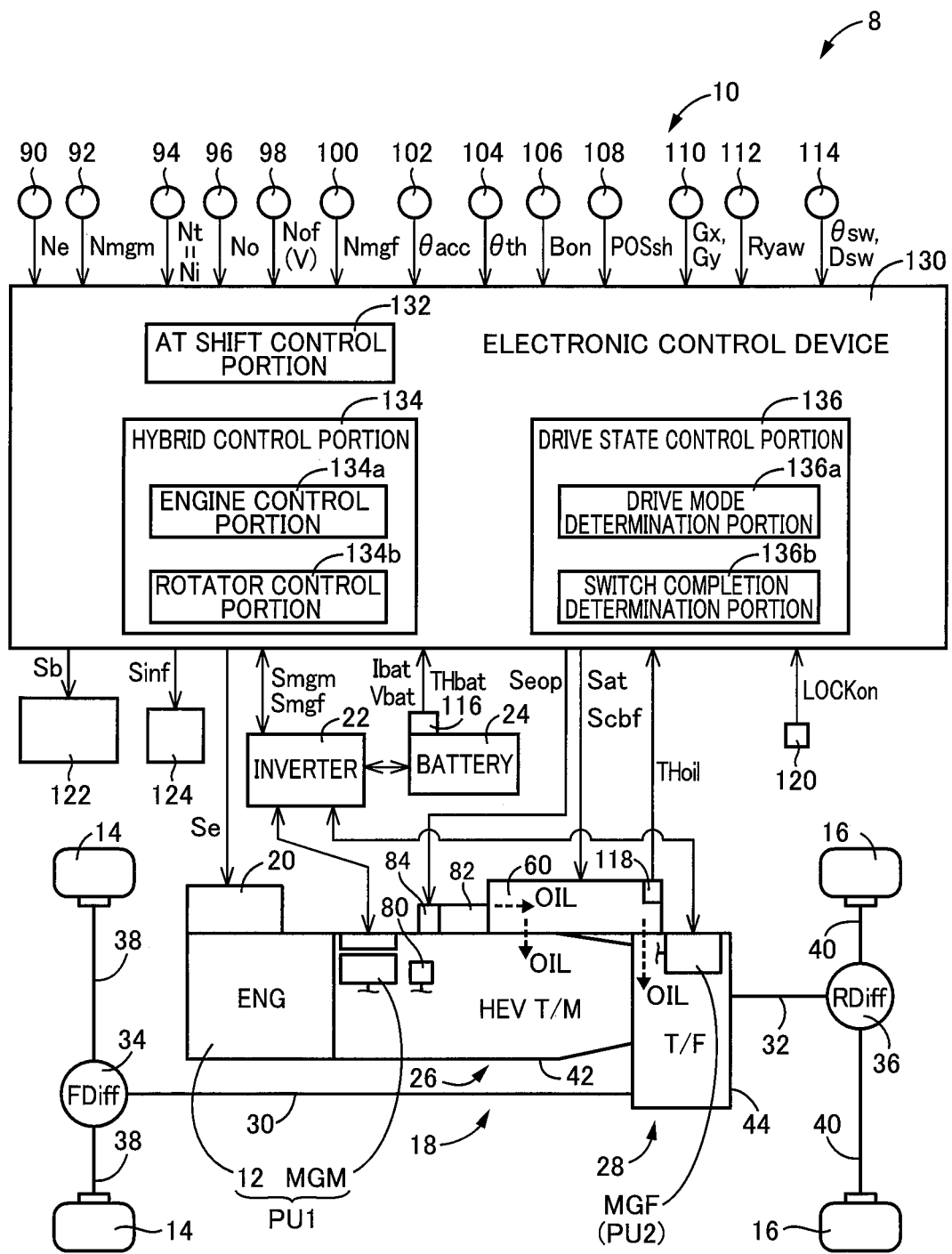
FIG. 1 is a diagram explaining a schematic configuration of a drive apparatus for vehicle to which the present invention is applied, and illustrates a principal part of control function and control system, for various controls effected in the drive apparatus for vehicle.

FIG. 1 is a diagram explaining a schematic configuration of a drive apparatus for vehicle 10 to which the present invention is applied, included in a vehicle 8. FIG. 1 illustrates a principal part of control function and control system, for various controls effected in the drive apparatus for vehicle 10. In FIG. 1, the drive apparatus for vehicle 10 includes: an engine (see ENG in the diagram) 12 acting as a power source; a TM rotator MGM, and a TF rotator MGF. The vehicle 8 is a hybrid vehicle. The drive apparatus for vehicle 10 includes: a pair of left and right front wheels 14, a pair of left and right rear wheels 16, and a power transmitting device 18. The power transmitting device 18 is a vehicle power transmitting device that transmits power from the engine 12, etc., to the front wheels 14 and the rear wheels 16. The engine 12, the TM rotator MGM, and the TF rotator MGF are referred to simply as power sources PU unless otherwise distinguished. In particular, the engine 12 and the TM rotator MGM outputting power to a torque converter 48 and an automatic transmission 50 described later make up a first power source PU1. The TM rotator MGM included in the first power source PU1 is a first rotator. The TF rotator MGF included in a transfer 28 described later is a second rotator and is a second power source PU2 used as a power source for driving the vehicle 8 in place of or along with the first power source PU1.

The vehicle 8 is an all-wheel drive vehicle capable of distributing to the front wheels 14 a part of torque transmitted to the rear wheels 16 by the drive apparatus for vehicle 10. The drive apparatus for vehicle 10 is capable of also front-wheel drive transmitting torque to only the front wheels 14, in addition to rear-wheel drive transmitting torque to only the rear wheels 16. The vehicle 8 is also a four-wheel drive vehicle since it has four wheels, i.e., the two front wheels 14 and the two rear wheels 16. In this embodiment, all-wheel drive (AWD) is equivalent to four-wheel drive (4WD). The rear-wheel drive and the front-wheel drive are each two-wheel drive (2WD).

The engine 12 is a publicly known internal combustion engine such as a gasoline engine or a diesel engine. In the engine 12, an engine torque $T_e$, torque of the engine 12, is controlled by controlling an engine control device 20 including a throttle actuator, a fuel injector, an ignitor, etc., disposed in the drive apparatus for vehicle 10, by an electronic control unit 130 that will be described later.

The TM rotator MGM and the TF rotator MGF are each a so-called motor generator that is a rotary electric machine functioning as both a mover that generates mechanical power from electric power and a generator that generates electric power from mechanical power. The TM rotator MGM and the TF rotator MGF are each connected, via an inverter 22 disposed in the drive apparatus for vehicle 10, to a battery 24 disposed in the drive apparatus for vehicle 10. In the TM rotator MGM and the TF rotator MGF, an MGM torque $T_{mgm}$, torque of the TM rotator MGM, and an MGF torque $T_{mgf}$, torque of the TF rotator MGF, are controlled by controlling the inverter 22 by the electronic control unit 130 that will be described later. The MGM torque $T_{mgm}$ and MGF torque $T_{mgf}$ are each a motoring torque (motor torque) when the rotator acts as the mover and is a regenerative torque (generator torque) when the rotator acts as the generator. The battery 24 is an electrical power accumulator that supplies/receives electrical power to/from each of the TM rotator MGM and the TF rotator MGF. The electrical power means electrical energy if not particularly distinguished. The power means driving power, torque, and force unless otherwise distinguished.

The power transmitting device 18 includes: a hybrid transmission 26 (see HEV T/M in the diagram); the transfer 28 (see T/F in the diagram); a front propeller shaft 30; a rear propeller shaft 32; a front differential 34 (see FDiff in the diagram); a rear differential 36 (see RDiff in the diagram); a pair of left and right front drive shafts 38; and a pair of left and right rear drive shafts 40. In the power transmitting device 18, power from the first power source PU1 transmitted via the hybrid transmission 26 is transmitted from the transfer 28 via the rear propeller shaft 32, the rear differential 36, the rear drive shafts 40, etc., in the mentioned order, to the rear wheels 16. In the power transmitting device 18, when a part of torque from the power source PU1 transmitted to the transfer 28 is distributed to the front wheels 14 side, the distributed torque is transmitted via the front propeller shaft 30, the front differential 34, the front drive shafts 38, etc., in the mentioned order, to the front wheels 14.

The hybrid transmission 26 includes a transmission case 42 that is a fixed member (non-rotating member). The transfer 28 includes a transfer case 44 that is a fixed member (non-rotating member) coupled to the transmission case 42. The TM rotator MGM is disposed within the transmission case 42. The TF rotator MGF is disposed within the transfer case 44.

Figure 2:
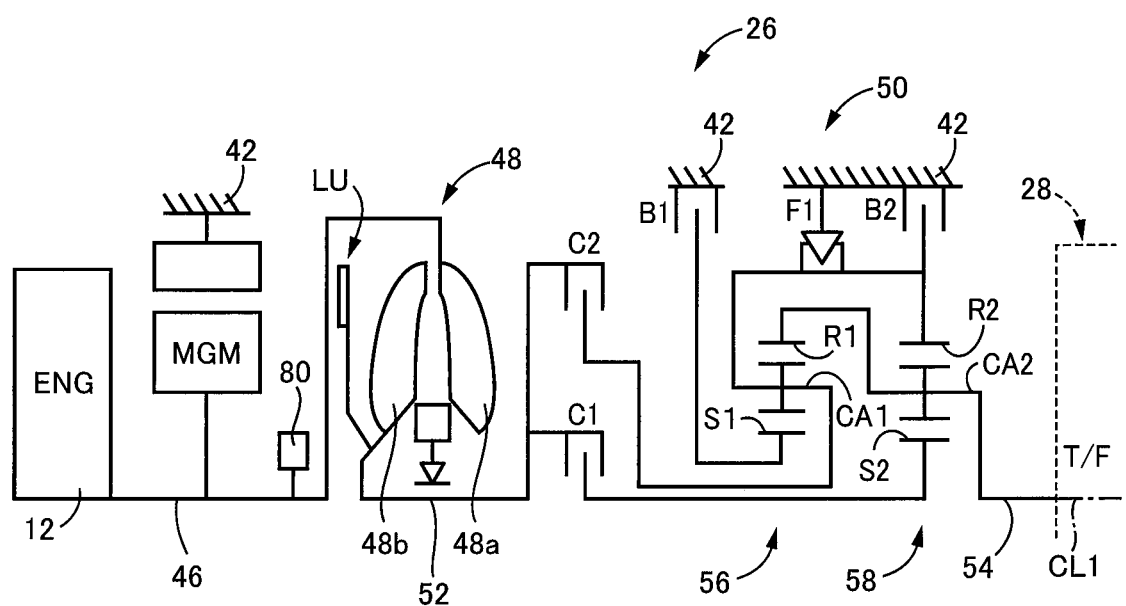
FIG. 2 is a diagram explaining a schematic configuration of the hybrid transmission in FIG. 1.

FIG. 2 is a diagram explaining a schematic configuration of the hybrid transmission 26. In FIG. 2, the hybrid transmission 26 includes a rotator coupling shaft 46, the torque converter 48, the automatic transmission 50, etc., that are arranged on a common rotation axis CL1 within the transmission case 42. The torque converter 48 and the automatic transmission 50 are configured approximately symmetrically with respect to the rotation axis CL1, with their lower halves with respect to the rotation axis CL1 not shown in FIG. 2. The rotation axis CL1 is a center axis of a crankshaft of the engine 12, the rotator coupling shaft 46 coupled to the crankshaft, a transmission input shaft 52 that is an input rotating member of the automatic transmission 50, a transmission output shaft 54 that is an output rotating member of the automatic transmission 50, etc.

The rotator coupling shaft 46 is a rotating shaft coupling the engine 12 and the torque converter 48. The TM rotator MGM is coupled to the rotator coupling shaft 46 in a power transmittable manner. The torque converter 48 includes: a pump blade wheel 48a coupled to the rotator coupling shaft 46; and a turbine blade wheel 48b coupled to the transmission input shaft 52. The pump blade wheel 48a is an input member of the torque converter 48 and is an input-side rotary element to which the first power source PU1 is coupled in a power transmittable manner. The turbine blade wheel 48b is an output member of the torque converter 48 and in an output-side rotary element which is coupled to the automatic transmission 50 in a power transmittable manner. The rotator coupling shaft 46 acts also as an input rotating member of the torque converter 48. The transmission input shaft 52 acts also as an output rotating member of the torque converter 48, formed integrally with a turbine shaft rotationally driven by the turbine blade wheel 48b. The torque converter 48 is a hydrodynamic power transmission device that transmits power from the first power source PU1, via fluid, to the transmission input shaft 52. The torque converter 48 includes a lock-up clutch LU as a direct clutch coupling the pump blade wheel 48a and turbine blade wheel 48b together.

The automatic transmission 50 intervenes on a power transmission path between the torque converter 48 and the transfer 28. The transmission output shaft 54 is coupled to the transfer 28. The automatic transmission 50 is a mechanical power transmitting device that transmits power from the first power source PU1, to the transfer 28. In this manner, the torque converter 48 and the automatic transmission 50 each transmit power from the first power source PU1, to the transfer 28.

The automatic transmission 50 is a publicly known planetary gear type automatic transmission that includes, for example: a plurality of planetary gear drives, i.e., a first planetary gear drive 56 and a second planetary gear drive 58; and a plurality of engagement devices including a one-way clutch F1, clutches C1 and C2, and brakes B1 and B2. Hereinafter, the clutches C1 and C2 and the brakes B1 and B2 are referred to simply as engagement devices CB, if not particularly distinguished.

The engagement devices CB are publicly known hydraulic type friction engagement devices including a clutch and a brake of multi-plate type or single-plate type pressed by a hydraulic actuator, a band brake tightened by the hydraulic actuator, etc. In each of the engagement devices CB, the control states, i.e., operation states such as engaged state, slip state, and released state are switched by changing a CB torque $T_{cb}$ that is a torque capacity thereof, by a CB oil pressure $PR_{cb}$ that is a regulated oil pressure on each of the engagement devices CB supplied from an oil pressure control circuit 60 (see FIG. 1) disposed in the drive apparatus for vehicle 10. The oil pressure control circuit 60 is controlled by the electronic control unit 130 that will be described later.

In the automatic transmission 50, some of the rotary elements of the first planetary gear drive 56 and the second planetary gear drive 58 are coupled to each other or are coupled to the transmission input shaft 52, the transmission case 42, or the transmission output shaft 54, directly or indirectly via the engagement devices CB and the one-way clutch F1. The rotatory elements of the first planetary gear drive 56 are a sun gear S1, a carrier CA1, and a ring gear R1, while the rotatory elements of the second planetary gear drive 58 are a sun gear S2, a carrier CA2, and a ring gear R2.

The automatic transmission 50 is a staged transmission in which any one of a plurality of shift stages (referred to also as gear stages) each having a different shift ratio (referred to also as gear ratio) $\gamma_{at}$ (=AT input rotation number $N_i$/AT output rotation number $N_o$) is formed when any of the engagement devices CB is engaged. In the automatic transmission 50, the gear stages formed in response to an accelerator operation of the driver (operator), a vehicle velocity V, etc. are switched by the electronic control device 130 that will be described later. In this embodiment, the gear stages formed by the automatic transmission 50 are referred to as AT gear stages. The input rotation number $N_i$ is the rotation number of the transmission input shaft 52 and is the input rotation number of the automatic transmission 50, the input rotation number $N_i$ being equal to a turbine rotation number $N_t$ that is the rotation number of the turbine shaft rotationally driven by the turbine blade wheel 48b. The output rotation number $N_o$ is the rotation number of the transmission output shaft 54 and is the output rotation number of the automatic transmission 50.

In the automatic transmission 50, as shown in an operation engagement table of FIG. 3 for example, the plurality of AT gear stages are formed that include forward four AT gear stages, i.e., a first AT gear stage ($1^{st}$ in the diagram) to a fourth AT gear stage ($4^{th}$ in the diagram). The first AT gear stage has a largest gear ratio $\gamma_{at}$, while the higher the AT gear stage goes up to the fourth AT gear stage, the smaller the gear ratio $\gamma_{at}$ becomes. The operation engagement table of FIG. 3 is a table putting together the relationships between the gear stages and the control states of the engagement devices CB. In FIG. 3, "○" represents the engaged state, "Δ" represents the engaged state during engine braking or during coast downshifting of the automatic transmission 50, and blank represents the released state. When an AT gear stage is formed in the automatic transmission 50, the automatic transmission 50 enters the state enabling power transmission, i.e., the power transmittable state. The neutral state (N in the diagram) of the automatic transmission 50 is the state where the automatic transmission 50 cannot transmit power, i.e., the state disabling power transmission, and is implemented, for example, by cutting off the power transmission in the automatic transmission 50 with all the engagement devices CB released. The automatic transmission 50 enters the neutral state (Rev in the diagram) during the backward running of the vehicle 8. When the vehicle 8 runs backward, power is output from, e.g., the TF rotator MGF.

Figure 4:
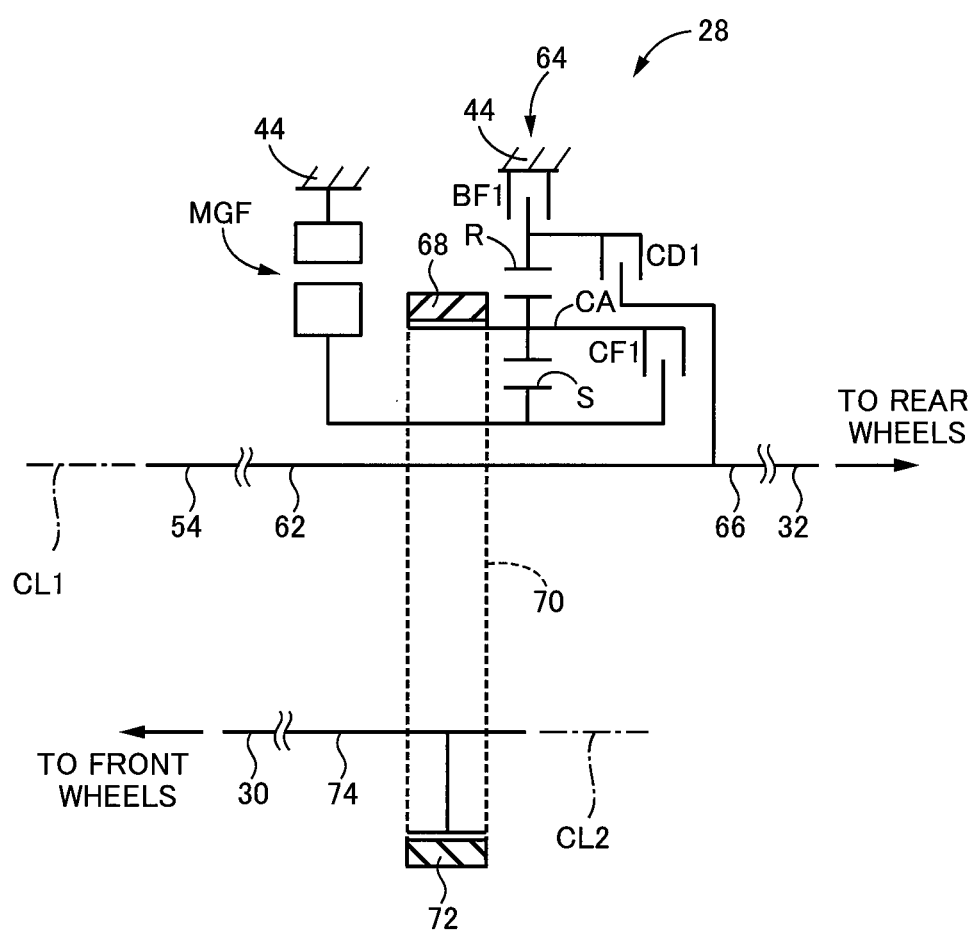
FIG. 4 is a diagram explaining a schematic configuration of the transfer in FIG. 1.

FIG. 4 is a diagram explaining a schematic configuration of the transfer 28. The transfer 28 includes a TF input shaft 62, a differential device 64, a TF clutch CF1, a TF brake BF1, a switching clutch CD1, a first output shaft 66, a first sprocket 68, etc., which are arranged on the common rotation axis CL1 within the transfer case 44. The transfer 28 includes the TF rotator MGF, a chain 70, etc., within the transfer case 44. The transfer 28 includes a second sprocket 72, a second output shaft 74, etc., which are arranged on a common rotation axis CL2 within the transfer case 44. The TF rotator MGF, the differential device 64, the TF clutch CF1, the TF brake BF1, the switching clutch CD1, and the first sprocket 68 are configured substantially symmetrically with respect to the rotation axis CL1, with their lower halves with respect to the rotation axis CL1 not shown in FIG. 4. The second sprocket 72 is configured substantially symmetrically with respect to the rotation axis CL2, with its upper half with respect to the rotation axis CL2 not shown in FIG. 4. The rotation axis CL2 is a center axis of the second output shaft 74, the front propeller shaft 30, etc.

The chain 70 is a member that is passed around the first sprocket 68 and the second sprocket 72 to couple them together. In other words, the first sprocket 68 and the second sprocket 72 are connected to each other via the chain 70 in a power transmittable manner.

The TF clutch CF1, the TF brake BF1, and the switching clutch CD1 are each a publicly known wet-type hydraulic friction engagement device, composed of a multi-plate or single-plate engagement device pressed by the hydraulic actuator. In the TF clutch CF1, the control state is switched by changing a CF1 torque $T_{cf1}$, i.e., the torque capacity of the TF clutch CF1 by a CF1 oil pressure $PR_{cf1}$ that is a regulated oil pressure on the TF clutch CF1 supplied from the oil pressure control circuit 60. The control state of the TF clutch CF1 includes: the released state (complete release state) where the TF clutch CF1 is completely released; the slip state (slip engagement state) where the TF clutch CF1 is engaged with slip; and the engaged state (complete engagement state) where the TF clutch CF1 is completely engaged. Also in the TF brake BF1, similarly to the TF clutch CF1, the control state such as the engaged state or the released state is switched by changing a BF1 torque $T_{bf1}$ by a BF1 oil pressure $PR_{bf1}$ supplied from the oil pressure control circuit 60. Also in the switching clutch CD1, similarly to the TF clutch CF1, the control state such as the engaged state or the released state is switched by changing a CD1 torque $T_{cd1}$ by a CD1 oil pressure $PR_{cd1}$ supplied from the oil pressure control circuit 60.

The TF input shaft 62 is coupled to the transmission output shaft 54 in a power transmittable manner. The first output shaft 66 is coupled to the rear propeller shaft 32 in a power transmittable manner. The TF input shaft 62 and the first output shaft 66 are integrally coupled to each other. This allows power from the first power source PU1 to be input via the automatic transmission 50, etc., to the first output shaft 66. Power input to the first output shaft 66 is transmitted via the rear propeller shaft 32, etc., to the rear wheels 16. The first output shaft 66 is a first output rotating member that receives power from the first power source PU1 and that outputs power to the rear wheels 16 as one wheels of the front wheels 14 and the rear wheels 16. The TF input shaft 62 and the first output shaft 66 may be a single rotating shaft.

The second output shaft 74 is coupled to the front propeller shaft 30 in a power transmittable manner. This allows power input to the second output shaft 74 to be transmitted via the front propeller shaft 30, etc., to the front wheels 14. The second output shaft 74 is a second output rotating member that outputs power to the front wheels 14 as the other wheels of the front wheels 14 and the rear wheels 16. The second sprocket 72 is secured to the second output shaft 74 in a relatively non-rotatable manner.

The differential device 64 is composed of a single-pinion type planetary gear drive and includes a sun gear S, a carrier CA, and a ring gear R. The TF rotator MGF is connected to the sun gear S in a power transmittable manner. The carrier CA is connected to the first sprocket 68. Hence, the second output shaft 74 is connected via the second sprocket 72, the chain 70, and the first sprocket 68 to the carrier CA in a power transmittable manner. The ring gear R is selectively connected via the TF brake BF1 to the transfer case 44. The ring gear R is selectively connected via the switching clutch CD1 to the TF input shaft 62 and the first output shaft 66. Thus, when the switching clutch CD1 enters the engaged state or the slip state, a part of power of the TF input shaft 62, i.e., the first output shaft 66 is input to the ring gear R of the differential device 64. The sun gear S and the carrier CA are selectively connected to each other via the TF clutch CF1. The TF clutch CF1 is an engagement device that selectively connects the sun gear S and the carrier CA to each other. The TF brake BF1 is an engagement device that selectively connects the ring gear R to the transfer case 44.

Figure 5:
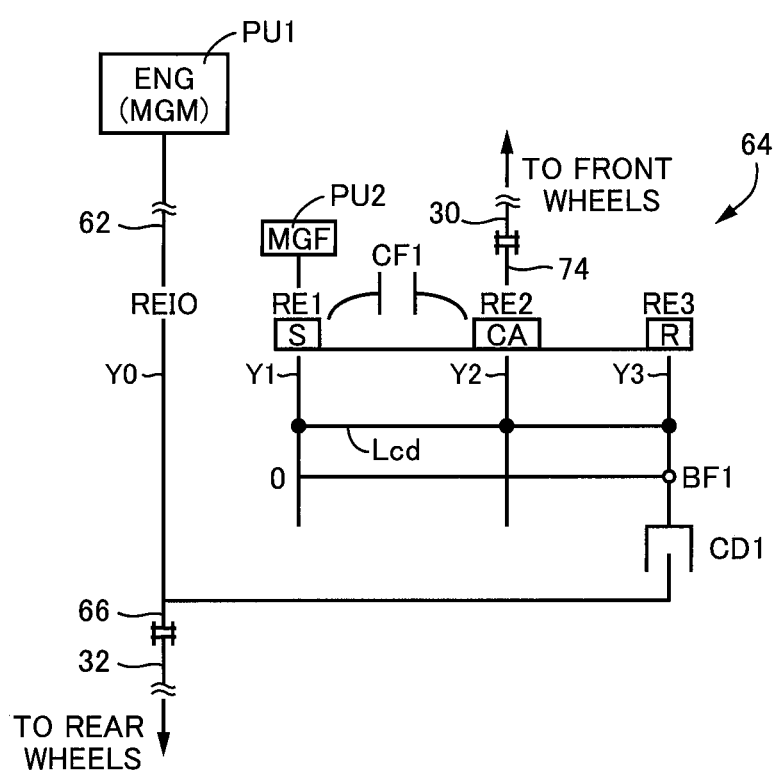
FIG. 5 is a collinear diagram representing relative relationships of rotation number among the rotary elements of the transfer in FIG. 4.

FIG. 5 is a collinear diagram representing relative relationships of rotation number among the rotary elements of the transfer 28. In FIG. 5, three vertical lines Y1, Y2, and Y3 corresponding to the three rotary elements of the differential device 64 constituting the transfer 28 are axes representing, respectively, in order from the left, the rotation number of the sun gear S corresponding to a first rotary element RE1, the rotation number of the carrier CA corresponding to a second rotary element RE2, and the rotation number of the ring gear R corresponding to a third rotary element RE3. A vertical line Y0 shown on the left side with respect to the vertical line Y1 is an axis representing the rotation number of the TF input shaft 62 and the first output shaft 66 that correspond to an input/output rotary element REIO.

If expressed using the collinear diagram of FIG. 5, in the transfer 28, the input/output rotary element REIO is selectively coupled via the switching clutch CD1 to the ring gear R and is coupled to the rear propeller shaft 32. The first power source PU1 including the engine 12 is coupled via the hybrid transmission 26 to the input/output rotary element REIO in a power transmittable manner.

In the differential device 64, the TF rotator MGF is connected to the first rotary element RE1 in a power transmittable manner. The second output shaft 74 as one output rotating member of the first output shaft 66 and the second output shaft 74 is connected to the second rotary element RE2. The third rotary element RE3 is selectively connected via the switching clutch CD1 to the first output shaft 66 and is selectively connected via the TF brake BF1 to the transfer case 44. The switching clutch CD1 is a first engagement device that selectively connects the third rotary element RE3 and the first output shaft 66 as the other output rotating member of the first output shaft 66 and the second output shaft 74. The first rotary element RE1 and the second rotary element RE2 are selectively connected to each other via the TF clutch CF1. The TF clutch CF1 is a second engagement device that selectively connects any two of the first rotary element RE1, the second rotary element RE2, and the third rotary element RE3. In the differential device 64, a straight line $L_{cd}$ represents mutual relationships of rotation number among the first rotary element RE1, the second rotary element RE2, and the third rotary element RE3.

In the differential device 64, when the TF clutch CF1 is in the engaged state with the TF brake BF1 in the released state, the first rotary element RE1, the second rotary element RE2, and the third rotary element RE3 are integrally rotated. On the other hand, in the differential device 64, when the TF clutch CF1 is released with the TF brake BF1 engaged, the rotation number of the second rotary element RE2 becomes smaller than that of the first rotary element RE1. Accordingly, by adding the TF clutch CF1 and the TF brake BF1, the differential device 64 functions as a gear shift device that selectively forms a high gear stage with the engaged TF clutch CF1 and a low gear stage with the engaged TF brake BF1.

When the TF clutch CF1 and TF brake BF1 are both released, the differential device 64 is allowed to exert its differential action. Thus, the differential device 64 functions as a center differential. At this time, when the switching clutch CD1 is in the engaged state or slip state in the transfer 28, the differential device 64 can distribute torque from the first power source PU1 input to the third rotary element RE3, to the second rotary element RE2 due to reaction torque of the TF rotator MGF coupled to the first rotary element RE1. Instead of applying reaction torque of the TF rotator MGF, the differential device 64 may distribute torque from the first power source PU1 input to the third rotary element RE3, to the second rotary element RE2 by slipping or engaging the TF clutch CF1 to limit the differential action of the differential device 64. In this manner, the transfer 28 is a torque distribution device that distributes a part of torque from the first power source PU1 input to the first output shaft 66, to the second output shaft 74. This allows the transfer 28 to distribute torque to the front wheels 14 and the rear wheels 16.

FIG. 6 is an operation engagement table explaining relationships between modes established in the transfer 28 and the control states of the engagement devices in the transfer 28. In FIG. 6, "○" represents the engaged state, blank represents the released state, and "○slip control" represents that a corresponding engagement device is controlled to the slip state, i.e., slip controlled.

A BEV (FF) high mode (referred to also as m1 mode) of No. m1 and a BEV (FF) low mode (referred to also as m2 mode) of No. m2 are implemented by engaging either the TF clutch CF1 or the TF brake BF1, with the switching clutch CD1 released. The m1 mode and the m2 mode are each a mode transmitting power from the TF rotator MGF, to the front wheels 14 side, in the differential device 64 forming a high gear stage by the engaged state of the TF clutch CF1 and a low gear stage by the engaged state of the TF brake BF1. The m1 mode and the m2 mode are each, for example, a motor drive mode (BEV drive mode) enabling motor running (BEV running) where a vehicle runs using only the TF rotator MGF as the power source with the first power source PU1 stopped. The BEV running of each of the m1 mode and the m2 mode is implemented by the front-wheel drive running.

A BEV_LSD mode (referred to also as m3 mode) of No. m3 is implemented by engaging the TF clutch CF1 with the TF brake BF1 released and by slip-controlling the switching clutch CD1. The m3 mode is also the BEV drive mode. The m3 mode is a mode in which, when the differential device 64 is in the state equivalent to the high gear stage, torque of the TF rotator MGF is distributed to the front wheels 14 and the rear wheels 16 at any desired ratio based on the torque capacity of the switching clutch CD1. That is, the m3 mode enables AWD running capable of arbitrarily changing a torque distribution ratio $R_x$ by regulating the torque capacity of the switching clutch CD1 in the BEV drive mode.

The torque distribution ratio $R_x$ is a proportion of torque from the power source PU to be distributed to the front wheels 14 and the rear wheels 16. The torque distribution ratio $R_x$ can be expressed, for example, by a rear-wheel distribution ratio $X_r$, i.e., a proportion of torque transmitted to the rear wheels 16 to the total torque transmitted from the power source PU to the rear wheels 16 and the front wheels 14. Alternatively, the torque distribution ratio $R_x$ can be expressed, for example, by a front-wheel distribution ratio $X_f$ (=1−$X_r$), i.e., a proportion of torque transmitted to the front wheels 14 to the total torque transmitted from the power source PU to the rear wheels 16 and the front wheels 14.

A BEV_Lock mode (referred to also as m4 mode) of No. m4 is implemented by engaging the TF clutch CF1 with the TF brake BF1 released and by engaging the switching clutch CD1. The m4 mode is also the BEV drive mode. The m4 mode is a mode in which torque of the TF rotator MGF is distributed at a fixed ratio to the front wheels 14 and the rear wheels 16 by putting the differential device 64 in the diff-lock state. That is, the m4 mode enables AWD running having a torque distribution ratio $R_x$ fixed to, e.g., 50[%] in the BEV drive mode.

In the BEV drive mode of each of the m1 to m4 modes, drag of the stopped engine 12 can be eliminated, for example, by putting the automatic transmission 50 in the neutral state.

A first power source torque split mode (referred to also as m5 mode) of No. m5 is implemented by releasing both the TF clutch CF1 and the TF brake BF1 and by engaging the switching clutch CD1. The m5 mode is a mode in which, for example, when the differential device 64 is in the state equivalent to the high gear stage, torque of the first power source PU1 transmitted from the first output shaft 66 via the switching clutch CD1 to the ring gear R of the differential device 64 is distributed to the front wheels 14 and the rear wheels 16 at any desired ratio based on reaction torque of the TF rotator MGF, by allowing the sun gear S to accept torque from the first power source PU1 by reaction torque of the TF rotator MGF. In the m5 mode of the transfer 28, the TF rotator MGF performs power running. The m5 mode is an HEV drive mode, i.e., a hybrid drive mode capable of hybrid running (HEV running), i.e., engine running in which the vehicle runs, e.g., using at least the first power source PU1 (esp., engine 12) as the power source. That is, the m5 mode enables AWD running capable of arbitrarily changing the torque distribution ratio $R_x$ by controlling torque of the TF rotator MGF in the REV drive mode.

A first power source LSD mode (referred to also as m6 mode) of No. m6 is implemented by slip-controlling the TF clutch CF1 with the TF brake BF1 released and by engaging the switching clutch CD1. The m6 mode is also the REV drive mode. The m6 mode is a mode in which, for example, when the differential device 64 is in the state equivalent to the high gear stage, torque of the first power source PU1 is distributed to the front wheels 14 and the rear wheels 16 at any desired ratio based on the torque capacity of the TF clutch CF1 by limiting the differential action of the differential device 64 due to the slip state of the TF clutch CF1. That is, the m6 mode enables AWD running capable of arbitrarily changing the torque distribution ratio $R_x$ by regulating the torque capacity of the TF clutch CF1 in the REV drive mode. In the m6 mode, power from the TF rotator MGF can be added to a drive torque $T_r$.

A first power source Lock mode (referred to also as m7 mode) of No. m7 is implemented by engaging the TF clutch CF1 with the TF brake BF1 released and by engaging the switching clutch CD1. The m7 mode is also the HEV drive mode. The m7 mode is a mode in which torque from the first power source PU1 is distributed to the front wheels 14 and the rear wheels 16 at a fixed ratio by putting the differential device 64 in the diff-lock state. That is, the m7 mode enables AWD running having a torque distribution ratio $R_x$ fixed to, e.g., 50[%] in the HEV drive mode. In the m7 mode, power from the TF rotator MGF can be added to the drive torque $T_r$.

A first power source two-wheel drive (FR) mode (referred to also as m8 mode) of No. m8 is implemented by releasing all of the TF clutch CF1, the TF brake BF1, and the switching clutch CD1. The m8 mode is also the HEV drive mode. The m8 mode is a mode allowing rear-wheel drive running by only power from the first power source PU1.

It is possible, for example, to establish another mode allowing AWD running in the REV drive mode, by putting the automatic transmission 50 in the power transmitting state with the first power source PU1 in operation, in the control states of the engagement devices of the transfer 28, equivalent to the m1 to m3 modes.

Referring back to FIG. 1, the drive apparatus for vehicle 10 includes: a mechanical oil pump 80 that is a mechanically-driven type oil pump; an electromotive oil pump 82 that is an electrically-driven type oil pump; a pump motor 84, etc. The mechanical oil pump 80 is coupled to, e.g., the rotator coupling shaft 46 (see FIG. 2) and is driven by the first power source PU1 to discharge working oil OIL for use in the power transmitting device 18. The pump motor 84 is a motor dedicated to the electromotive oil pump 82 for driving the electromotive oil pump 82. The electromotive oil pump 82 is driven by the pump motor 84 to discharge working oil OIL. Working oil OIL discharged from the mechanical oil pump 80 and the electromotive oil pump 82 is supplied to the oil pressure control circuit 60. The oil pressure control circuit 60 supplies the CB oil pressure $PR_{cb}$, the CF1 oil pressure $PR_{cf1}$, the BF1 oil pressure $PR_{bf1}$, the CD1 oil pressure $PR_{cd1}$, etc., which are each regulated based on working oil OIL discharged from at least one of the mechanical oil pump 80 and the electromotive oil pump 82.

The drive apparatus for vehicle 10 includes the electronic control device 130 as a controller including a control device that controls the power sources PU, the transfer 28, etc. FIG. 1 is a diagram showing an input/output system of the electronic control device 130 and is a function block diagram explaining a principal part of control function provided by the electronic control device 130. The electronic control device 130 is configured including a so-called microcomputer having, e.g., a CPU, a RAM, a ROM, an I/O interface, etc., the CPU performing signal processing in accordance with a program stored in the ROM while utilizing a temporary memory function of the RAM, to thereby execute various controls of the drive apparatus for vehicle 10. The electronic control device 130 is configured, as needed, including computers for engine control, shift control, etc.

The electronic control device 130 is fed with various signals, etc., that are based on detection values of corresponding sensors, respectively, disposed in the drive apparatus for vehicle 10. The various signals, etc., include, for example: an engine rotation number $N_e$ that is the rotation speed of the engine 12; an MGM rotation number $N_{mgm}$ that is the rotation speed of the TM rotator MGM; the turbine rotation number $N_t$ equal to the AT input rotation number $N_i$; the AT output rotation number $N_o$; a TF output rotation number $N_{of}$ that is the rotation speed of the first output shaft 66 corresponding to the vehicle velocity V; an MGF rotation number $N_{mgf}$ that is the rotation speed of the TF rotator MGF; an accelerator opening $\theta_{acc}$ that is the amount of the driver's accelerator operation indicating the magnitude of the driver's accelerating operation; a throttle valve opening $\theta_{th}$ that is the opening degree of an electronic throttle valve; a brake-on signal $B_{on}$ that is a signal indicative of the state where a brake pedal for activating wheel brakes is being operated by the driver; a shift operation position $POS_{sh}$ indicative of the operation position of a shift lever disposed in the vehicle 8; a longitudinal acceleration $G_x$ and a lateral acceleration $G_y$ of the vehicle 8; a yaw rate $R_{yaw}$ that is the rotation angular velocity around a vertical axis of the vehicle 8; a steering angle $\theta_{sw}$ and a steering direction $D_{sw}$ of a steering wheel disposed in the vehicle 8; a battery temperature $TH_{bat}$, a battery charge/discharge current $I_{bat}$, and a battery voltage $V_{bat}$ of the battery 24; a working oil temperature $TH_{oil}$ that is the temperature of working oil OIL; a lock-mode-on signal $LOCK_{on}$ that is a signal indicating that the driver selects the BEV_Lock mode or the first power source Lock mode; etc. The corresponding sensors include, for example, an engine rotation number sensor 90, an MGM rotation number sensor 92, a turbine rotation number sensor 94, an AT output rotation number sensor 96, a vehicle velocity sensor 98, an MGF rotation number sensor 100, an accelerator opening sensor 102, a throttle valve opening sensor 104, a brake pedal sensor 106, a shift position sensor 108, an acceleration sensor 110, a yaw rate sensor 112, a steering sensor 114, a battery sensor 116, an oil temperature sensor 118, a diff-lock selection switch 120, etc.

The diff-lock selection switch 120 is disposed, e.g., in the vicinity of the driver's seat. The diff-lock selection switch 120 is a switch to be turned on by the driver when locking the differential device 64 of the transfer 28.

The electronic control unit 130 outputs various command signals to the devices (e.g., the engine control device 20, the inverter 22, the oil pressure control circuit 60, the pump motor 84, a wheel brake device 122, an information notification device 124, etc.). The various command signals include, for example: an engine control command signal $S_e$ for controlling the engine 12; an MGM control command signal $S_{mgm}$ for controlling the TM rotator MGM; an MGF control command signal $S_{mgf}$ for controlling the TF rotator MGF; an oil pressure control command signal $S_{at}$ for controlling the control state of each of the engagement devices CB related to control of the automatic transmission 50; an oil pressure control command signal $S_{cbf}$ for controlling the control state of each of the TF clutch CF1, the TF brake BF1, and the switching clutch CD1 related to control of the transfer 28; an electromotive oil pump control command signal $S_{eop}$ for controlling the electromotive oil pump 82; a brake control command signal $S_b$ for controlling the braking force of the wheel brakes; an information notification control command signal $S_{inf}$ for notifying the driver of various pieces of information; etc.

To implement various controls in the drive apparatus for vehicle 10, the electronic control device 130 includes: an AT shift control portion 132 as AT shift control means; a hybrid control portion 134 as hybrid control means; and a drive state control portion 136 as drive state control means.

Figure 7:
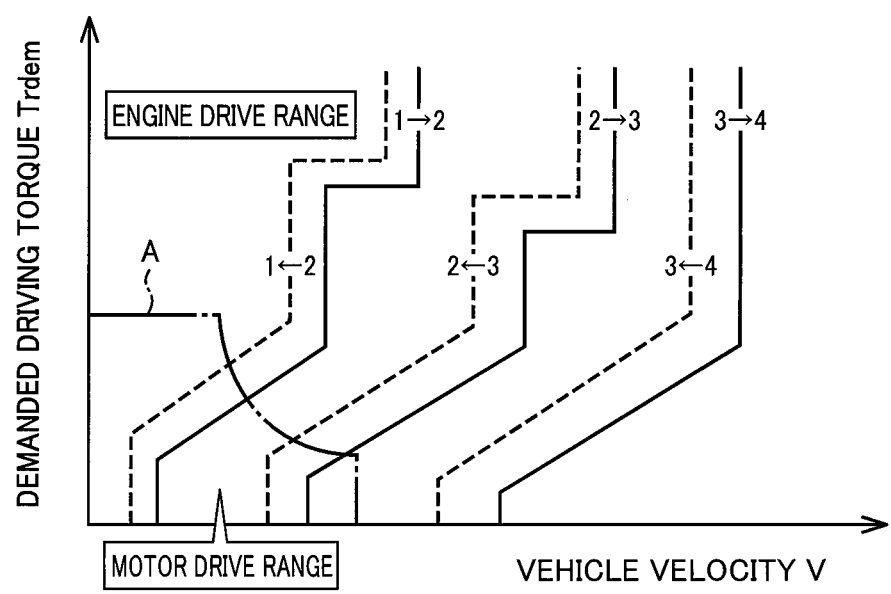
FIG. 7 shows an example of the AT gear stage shift map used for the shift control of the automatic transmission and the drive range switching map used for the switching of the drive mode.

The AT shift control portion 132 makes shift determination of the automatic transmission 50 using, e.g., an AT gear stage shift map as shown in FIG. 7, and, as needed, outputs the oil pressure control command signal $S_{at}$ for executing shift control of the automatic transmission 50, to the oil pressure control circuit 60. The AT gear stage shift map represents predefined relationships, i.e., relationships found experimentally or by design in advance for storage therein. The AT gear stage shift map represents predetermined relationships having shift lines for determining shifting of the automatic transmission 50 on two-dimensional coordinates with the vehicle velocity V and a demanded driving torque $T_{rdem}$ as variables. In the AT gear stage shift map, the vehicle velocity V may be substituted by, e.g., the AT output rotation number $N_o$, while the demanded driving torque $T_{rdem}$ may be substituted by, e.g., a demanded driving force $F_{rdem}$, the accelerator opening $\theta_{acc}$, or the throttle valve opening $\theta_{th}$. The shift lines of the AT gear stage shift map are: upshift lines for determining upshifting as indicated by solid lines; and downshift lines for determining downshifting as indicated by broken lines.

The hybrid control portion 134 includes: a function of an engine control portion 134a as engine control means controlling the operation of the engine 12; and a function of a rotator control portion 134b as rotator control means controlling the operations of the TM rotator MGM and the TF rotator MGF via the inverter 22, those control functions executing hybrid drive control, etc., of the engine 12, the TM rotator MGM, and the TF rotator MGF.

The hybrid control portion 134 applies the accelerator opening $\theta_{acc}$ and the vehicle velocity V to, e.g., a drive demand amount map representing predefined relationships, to calculate the driver's drive demand amount for the vehicle 8. The drive demand amount is, e.g., the demanded driving torque $T_{rdem}$ [Nm] of driving wheels (front wheels 14 and rear wheels 16). The drive demand amount can be, for example, the demanded driving force $F_{rdem}$ [N] of the driving wheels, a demanded driving power $P_{rdem}$ [W] of the driving wheels, or a demanded AT output torque of the transmission output shaft 54. From a different viewpoint, the demanded driving torque $T_{rdem}$ is the demanded driving power $P_{rdem}$ at the vehicle velocity V upon issuing the command. In calculation of the drive demand amount, the TF output rotation number $N_{of}$ for example may be used in place of the vehicle velocity V.

Considering power transmission losses, accessory loads, the gear ratio $\gamma_{at}$ of the automatic transmission 50, the gear stage of the differential device 64, a chargeable power $W_{in}$ and a dischargeable power $W_{out}$ of the high-voltage battery 24, etc., the hybrid control portion 134 issues the engine control command signal $S_e$, the MGM control command signal $S_{mgm}$, and the MGF control command signal $S_{mgf}$ so as to achieve the demanded driving power $P_{rdem}$. The engine control command signal $S_e$ is, for example, a command value for achieving a demanded engine power $P_{edem}$ that is a demanded value of an engine power $P_e$ outputting the engine torque $T_e$ at the engine rotation number $N_e$ upon issuing the command. The engine power $P_e$ is an output [W], i.e., a power of the engine 12. The MGM control command signal $S_{mgm}$ is, for example, a command value of a consumed electric power $W_{cmgm}$ or a generated electric power $W_{gmgm}$ of the TM rotator MGM outputting the MGM torque $T_{mgm}$ at the MGM rotation number $N_{mgm}$ upon issuing the command. The MGF control command signal $S_{mgf}$ is, for example, a command value of a consumed electric power $W_{cmgf}$ or a generated electric power $W_{gmgf}$ of the TF rotator MGF outputting the MGF torque $T_{mgf}$ at the MGF rotation number $N_{mgf}$ upon issuing the command.

The chargeable power $W_{in}$ of the battery 24 is a maximum inputtable electric power specifying an input power limit of the battery 24 and indicates an input limit of the battery 24. The dischargeable power $W_{out}$ of the battery 24 is a maximum outputtable electric power specifying an output power limit of the battery 24 and indicates an output limit of the battery 24. The chargeable power $W_{in}$ and the dischargeable power $W_{out}$ of the battery 24 are figured out by the electronic control device 130, based on, e.g., the battery temperature $TH_{bat}$ and a state-of-charge value SOC [%] of the battery 24. The state-of-charge value SOC of the battery 24 is a value indicative of the state of charge that is equivalent to the amount of charge of the battery 24, and is calculated by the electronic control device 130, based on, e.g., the battery charge/discharge current $I_{bat}$, the battery voltage $V_{bat}$, etc.

In case that the demanded driving power $P_{rdem}$ lies within a motor drive range less than a predefined threshold value, the hybrid control portion 134 establishes the BEV drive mode as the drive mode driving the vehicle 8. On the other hand, in case that the demanded driving power $P_{rdem}$ is within a motor drive range equal to or greater than the predefined threshold value, the hybrid control portion 134 establishes the HEV drive mode as the drive mode. A chain-dotted line A of FIG. 7 indicates a boundary line between an engine drive range and the motor drive range. The predefined relationships having the boundary line indicated by the chain-dotted line A are an example of a drive range switching map composed of the two-dimensional coordinates with the vehicle velocity V and the demanded driving torque $T_{rdem}$ as variables. In FIG. 7, for convenience, this drive range switching map is shown together with the AT gear stage shift map.

Even when the demanded driving power $P_{rdem}$ lies within the motor drive range, if the state-of-charge value SOC of the battery 24 is less than a predefined engine startup threshold value or if the engine 12 needs to be warmed up, the hybrid control portion 134 establishes the HEV drive mode. From a different viewpoint, if the state-of-charge value SOC of the battery 24 is less than the predefined engine startup threshold value or if the engine 12 needs to be warmed up, the drive range switching map has no motor drive range. The engine startup threshold value is a predefined threshold value for determining whether the state-of-charge value SOC is a level needing automatic startup of the engine 12 to charge the battery 24.

The drive apparatus for vehicle 10 can change an engine working point $PNT_{eng}$ as in a continuously variable transmission by controlling the TM rotator MGM. The engine working point $PNT_{eng}$ is a working point, i.e., an operating point of the engine 12 expressed by the engine rotation number $N_e$ and the engine torque $T_e$.

Figure 8:
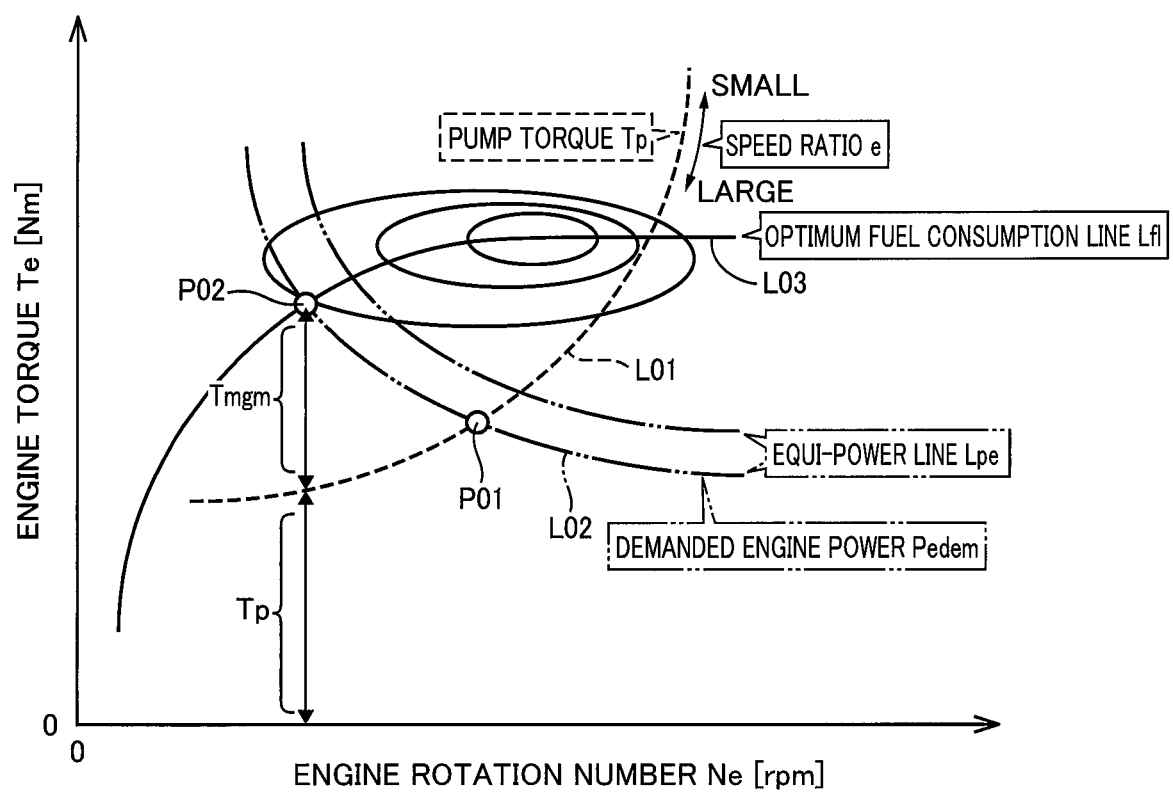
FIG. 8 is a diagram explaining that the engine working point is changeable depending on the torque.

FIG. 8 is a diagram explaining that the engine working point $PNT_{eng}$ is changeable depending on the MGM torque $T_{mgm}$. In FIG. 8, equi-power lines $L_{pe}$ indicated by chain double-dotted lines each show an example of the demanded engine power $P_{edem}$ for achieving the demanded driving power $P_{rdem}$ calculated in accordance with, e.g., the accelerator opening $\theta_{acc}$. The demanded engine power $P_{edem}$ is an engine power $P_e$ demanded by the driver's operation such as the accelerator operation. On the other hand, for convenience, a broken line L01 shows an example of a pump torque $T_p$ that is a torque occurring on the pump blade wheel 48a depending on a speed ratio e ($=N_t/N_p$) of the torque converter 48, on the two-dimensional coordinates with the engine rotation number $N_e$ and the engine torque $T_e$ as variables. A pump rotation number $N_p$ is a rotation number of the pump blade wheel 48a and is equal to the engine rotation number $N_e$. At a certain turbine rotation number $N_t$, the pump torque $T_p$ represents the relationship with the engine rotation number $N_e$ determined by hard requirements, as in the broken line L01. Then, when the demanded engine power $P_{edem}$ is, for example, on the chain double-dotted line L02, the engine working point $PNT_{eng}$ results naturally in a so-called a coupling point P01 where the broken line L01 and the chain double-dotted line L02 intersect with each other.

For example, by allowing the TM rotator MGM to act to generate electric power using a part of the engine power $P_e$, the engine working point $PNT_{eng}$ can shift from the coupling point P01 to, e.g., an optimum fuel consumption point P02 on an optimum fuel consumption line Lfl indicated by a solid line L03 without changing the demanded engine power $P_{edem}$. The optimum fuel consumption line Lfl is a predefined operating curve of the engine 12 representing the relationship between the engine rotation number $N_e$ and the engine torque $T_e$ optimizing the fuel consumption of the engine 12 and is a series of optimum fuel consumption points defined in advance as the engine working points optimum for improvement in the fuel consumption of the engine 12. In the drive apparatus for vehicle 10, the engine working point $PNT_{eng}$ can shift arbitrarily without any constraint of the engine working point $PNT_{eng}$ by the turbine rotation number $N_t$, by regulating the MGM torque $T_{mgm}$ so that the sum of the engine torque $T_e$ and the MGM torque $T_{mgm}$ coincides with the pump torque $T_p$, i.e., so that a relationship $T_p = T_e + T_{mgm}$ ($T_{mgm}$ of FIG. 8 is a negative value) is established. In case that the MGM torque $T_{mgm}$ is a negative value, i.e., in case that the TM rotator MGM serves to generate electric power, electric power generated by the TM rotator MGM is basically supplied to the TF rotator MGF, which in turn converts the electric power into mechanical power. The drive apparatus for vehicle 10 includes, as the power transmission path for the engine power $P_e$: an electrical path that is an electrical channel through which power is electrically transmitted by supply/reception of electric power between the TM rotator MGM and the TF rotator MGF; and a mechanical path that is a mechanical channel through which power is mechanically transmitted via the torque converter 48. The drive apparatus for vehicle 10 forms an electric continuously variable transmission by using the TM rotator MGM and the TF rotator MGF.

The hybrid control portion 134 controls the engine working point $PNT_{eng}$ by regulating an electrical path amount $P_{pse}$ [W] that is the magnitude of electric power in the electrical path through which electric power is supplied/received between the TM rotator MGM and the TF rotator MGF. The electrical path amount $P_{pse}$ is, for example, the product of the MGM torque $T_{mgm}$ and the MGM rotation number $N_{mgm}$.

The hybrid control portion 134 finds a target electrical path amount $P_{psetgt}$ that is the electrical path amount $P_{pse}$ for shifting the engine working point $PNT_{eng}$ to a target working point $PNT_{tgt}$. The target working point $PNT_{tgt}$ is, for example, an optimum fuel consumption point and, when the demanded engine power $P_{edem}$ is represented by the chain double-dotted line L02, it is the optimum fuel consumption point P02 (see FIG. 8). The target electrical path amount $P_{psetgt}$ is the product of the MGM torque $T_{mgm}$ when shifting the engine working point $PNT_{eng}$ from the coupling point P01 to the target working point $PNT_{tgt}$ and the engine rotation number $N_e$, i.e., the MGM rotation number $N_{mgm}$ at the target working point $PNT_{tgt}$. The hybrid control portion 134 controls the MGM torque $T_{mgm}$ and drives the TF rotator MGF so that the electrical path amount $P_{pse}$ from the TM rotator MGM to the TF rotator MGF becomes equal to the target electrical path amount $P_{psetgt}$. This enables the engine 12 to have improved combustion efficiency and fuel consumption with the same engine power $P_e$.

The drive state control portion 136 determines which mode to establish among the modes (see FIG. 6) of the transfer 28, based on the running states such as, e.g., the vehicle velocity V, the accelerator opening $\theta_{acc}$, the longitudinal acceleration $G_x$ and the lateral acceleration $G_y$, the yaw rate $R_{yaw}$, the steering angle $\theta_{sw}$ and the steering direction $D_{sw}$, the lock-mode-on signal $LOCK_{on}$, wheel slip ratios of the front and rear wheels, etc., and issues various control command signals for establishing the determined mode. An example of the various control command signals is the oil pressure control command signal $S_{cbf}$ for the TF clutch CF1, the TF brake BF1, and the switching clutch CD1.

In the BEV drive mode for example, the drive state control portion 136 forms a low gear stage in the differential device 64 with the TF brake BF1 engaged and the TF clutch CF1 released in a relatively low vehicle velocity range, whereas it forms a high gear stage in the differential device 64 with the TF brake BF1 released and the TF clutch CF1 engaged in a relatively high vehicle velocity range. That is, in the BEV drive mode, as the drive mode driving the vehicle 8, the drive state control portion 136 establishes the BEV (FF) low mode in the relatively low vehicle velocity range for example, but establishes the BEV (FF) high mode in the relatively high vehicle velocity range.

In the BEV drive mode for example, if it is determined based on the running state that switching to the AWD running is necessary, the drive state control portion 136 establishes the BEV_LSD mode as the drive mode driving the vehicle 8. If the diff-lock selection switch 120 is turned on in the BEV_LSD mode for example, the drive state control portion 136 establishes the BEV_Lock mode as the drive mode driving the vehicle 8.

In the HEV drive mode for example, the drive state control portion 136 establishes the first power source two-wheel drive (FR) mode as the drive mode driving the vehicle 8.

In the HEV drive mode for example, if it is determined based on the running state that switching to the AWD running is necessary, the drive state control portion 136 establishes the first power source torque split mode or the first power source LSD mode as the drive mode driving the vehicle 8. If the diff-lock selection switch 120 is turned on in the first power source torque split mode or the first power source LSD mode for example, the drive state control portion 136 establishes the first power source Lock mode as the drive mode driving the vehicle 8.

For example, in the BEV_LSD mode, the first power source torque split mode, or the first power source LSD mode, the drive state control portion 136 determines the running state of the vehicle 8, based on signals from the vehicle velocity sensor 98, the accelerator opening sensor 102, the yaw rate sensor 112, the steering sensor 114, etc., to set a target value of the torque distribution ratio $R_x$ in accordance with the determined running state.

In the BEV_LSD mode, the drive state control portion 136 issues the oil pressure control command signal $S_{cbf}$ for slip-controlling the switching clutch CD1 so that the torque distribution ratio $R_x$, e.g., the rear-wheel distribution ratio $X_r$ reaches the target value by regulating the torque capacity of the switching clutch CD1. As increasing the torque capacity of the switching clutch CD1, the rear-wheel distribution ratio $X_r$ increases, i.e., the front-wheel distribution ratio $X_f$ decreases.

In the first power source torque split mode, the drive state control portion 136 issues the MGF control command signal $S_{mgf}$ for controlling the TF rotator MGF so that the rear-wheel distribution ratio $X_r$ for example reaches the target value by regulating the MGF torque $T_{mgf}$ causing the TF rotator MGF to generate reaction torque. As increasing the MGF torque $T_{mgf}$, the rear-wheel distribution ratio $X_r$ decreases.

In the first power source LSD mode, the drive state control portion 136 issues the oil pressure control command signal $S_{cbf}$ for slip-controlling the TF clutch CF1 so that the rear-wheel distribution ratio $X_r$ for example reaches the target value by regulating the torque capacity of the TF clutch CF1. As increasing the torque capacity of the TF clutch CF1, the rear-wheel distribution ratio $X_r$ decreases.

By the way, the power source driving the vehicle 8 is switched from the second power source PU2 to the first power source PU1 in response to switching of the drive mode from the BEV_Lock mode (m4 mode) as the first drive mode that puts the vehicle 8 in the AWD state using power from the second power source PU2 while fixing the torque distribution ratio $R_x$ with both the switching clutch CD1 and the TF clutch CF1 kept engaged to the first power source LSD mode (m6 mode) as the second drive mode that controls the torque distribution ratio $R_x$ by putting the vehicle 8 in the AWD state using power from the first power source PU1 while slip-controlling the TF clutch CF1 with the switching clutch CD1 kept engaged. Change in the torque distribution ratio $R_x$ caused by this power source switching may possibly lead to deterioration in running stability.

Thus, when switching the drive mode driving the vehicle 8 from the m4 mode to the m6 mode, the drive state control portion 136 switches the TF clutch CF1 from the engaged state to the slip state with the switching clutch CD1 kept engaged, after switching the power source driving the vehicle 8 from the second power source PU2 to the first power source PU1. That is, when switching the drive mode driving the vehicle 8 from the m4 mode to the m6 mode, the drive state control portion 136 switches the power source from the second power source PU2 to the first power source PU1 in the m4 mode having the fixed torque distribution ratio $R_x$, to once establish the m7 mode having the fixed torque distribution ratio $R_x$, in which state the drive state control portion 136 slip-controls the TF clutch CF1 for switch to the m6 mode.

When switching the power source driving the vehicle 8 from the second power source PU2 to the first power source PU1, if the torque increase of the first power source PU1 delays with respect to the torque reduction of the second power source PU2, temporary drop of the drive torque $T_r$ may possibly occur.

Thus, when switching the power source driving the vehicle 8 from the second power source PU2 to the first power source PU1, the drive state control portion 136 reduces torque of the second power source PU2 depending on increase in torque of the first power source PU1. That is, when switching the power source driving the vehicle 8 from the second power source PU2 to the first power source PU1, the drive state control portion 136 issues a control command signal for switching the running mode from the motor running using the TF rotator MGF to the engine running using the first power source PU1 (esp., the engine 12). At this time, for example, the drive state control portion 136 issues the engine control command signal $S_e$ for activating the engine 12 to increase the engine torque $T_e$ toward the demanded value of the engine torque $T_e$ achieving the demanded engine power $P_{edem}$ and issues the MGF control command signal $S_{mgf}$ for reducing the MGF torque $T_{mgf}$ toward zero depending on increase in the engine torque $T_e$.

For switching the drive mode between the first drive mode and second drive mode, the drive state control portion 136 includes: a function of a drive mode determination portion 136a as drive mode determination means; and a function of a switching completion determination portion 136b as switching completion determination means.

The drive mode determination portion 136a determines whether the current running drive mode is the m4 mode. The drive mode determination portion 136a further determines whether switch from the m4 mode to the m6 mode has been determined during running in the m4 mode.

If it is determined by the drive mode determination portion 136a that switch from the m4 mode to the m6 mode has been determined, the drive state control portion 136 issues a control command signal for activating torque of the first power source PU1 and reducing torque of the second power source PU2 depending on increase in torque of the first power source PU1, while keeping the switching clutch CD1 and the TF clutch CF1 engaged.

The switching completion determination portion 136b determines whether switch of the power source from the second power source PU2 to the first power source PU1 has been completed. That is, the switching completion determination portion 136b determines whether switch from the m4 mode to the m7 mode has been completed.

If it is determined by the switching completion determination portion 136b that switch of the power source has been completed, the drive state control portion 136 issues a control command signal for switching the drive mode from the m7 mode to the m6 mode. For example, the drive state control portion 136 outputs the oil pressure control command signal $S_{cbf}$ for slip-controlling the TF clutch CF1.

Figure 9:
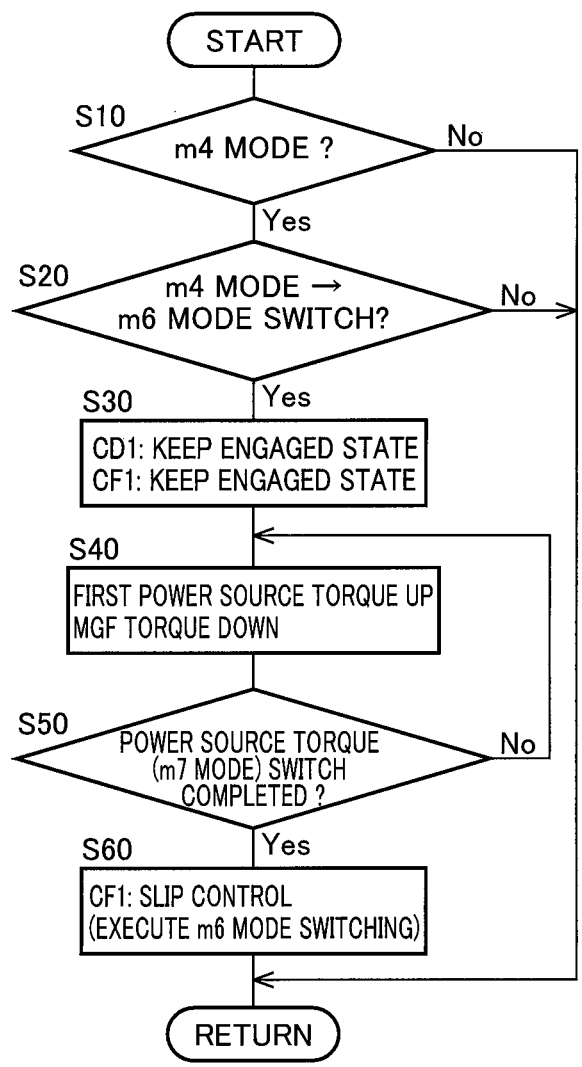
FIG. 9 is a flowchart explaining a principal part of control operation of the electronic control device and is a flowchart explaining control operation for suppressing deterioration in the running stability upon switching of the drive mode involving the power source switching.

FIG. 9 is a flowchart explaining a principal part of control operation of the electronic control device 130 and is a flowchart explaining control operation for suppressing deterioration in the running stability upon switching of the drive mode involving the power source switching, in which steps are repeatedly executed.

Referring to FIG. 9, first, at step (hereinafter, the term "step" will be omitted) S10 corresponding to the function of the drive mode determination portion 136a, it is determined whether the current running drive mode is the m4 mode. If determination at S10 is negative, this routine comes to an end. If determination at S10 is affirmative, at S20 corresponding to the function of the drive mode determination portion 136a, it is determined whether switch from the m4 mode to m6 mode has been determined. If determination at S20 is negative, this routine terminates. If determination at S20 is affirmative, at S30 corresponding to the function of the drive state control portion 136, there is kept the output of the oil pressure control command signal $S_{cbf}$ for rendering both the switching clutch CD1 and the TF clutch CF1 engaged. That is, the diff-lock state in AWD having the fixed torque distribution ratio $R_x$ is kept. Next, at S40 corresponding to the function of the drive state control portion 136, there are issued the engine control command signal $S_e$ for activating torque of the first power source PU1, e.g., the engine torque $T_e$ and increasing the engine torque $T_e$ and the MGF control command signal $S_{mgf}$ for reducing the MGF torque $T_{mgf}$ depending on increase in the engine torque $T_e$. That is, control command signals for switch to the m7 mode are issued. Next, at S50 corresponding to the function of the switching completion determination portion 136b, it is determined whether switch of the power source from the second power source PU2 to the first power source PU1 has been completed. If determination at S50 is negative, the procedure goes back to S40 described above. If determination at S50 is affirmative, at S60 corresponding to the function of the drive state control portion 136, the oil pressure control command signal $S_{cbf}$ is issued that slip-controls the TF clutch CF1 so that the torque distribution ratio $R_x$ reaches the target value. That is, a control command signal for switch to the m6 mode is issued.

As above, according to this embodiment, when the drive mode is switched from the m4 mode to the m6 mode, the power source is switched with the torque distribution ratio $R_x$ fixed since the TF clutch CF1 is switched from the engaged state to the slip state while keeping the switching clutch CD1 engaged, after switching the power source from the second power source PU2 to the first power source PU1. This prevents the torque distribution ratio $R_x$ from changing due to the power source switching. In consequence, deterioration in the running stability can be suppressed upon switching of the drive mode involving the power source switching.

According to this embodiment, since upon switching the power source from the second power source PU2 to the first power source PU1, torque of the second power source PU2 is reduced depending on increase in torque of the first power source PU1, drop in the drive torque $T_r$ due to power source switching can be suppressed.

Other embodiments of the present invention will then be described. In the following description, portions common among the embodiments will not again be described with the same reference numerals.

Along with switching the drive mode from the first power source LSD mode (m6 mode) as the second drive mode to the BEV_Lock mode (m4 mode) as the first drive mode, the power source driving the vehicle 8 is switched from the first power source PU1 to the second power source PU2. When this power source switching causes change in the torque distribution ratio $R_x$, the running stability may possibly deteriorate.

Accordingly, when switching the drive mode driving the vehicle 8 from the m6 mode to the m4 mode, the drive state control portion 136 switches the power source driving the vehicle 8 from the first power source PU1 to the second power source PU2, after switching the TF clutch CF1 from slip state to the engaged state while keeping the switching clutch CD1 engaged. That is, when switching the drive mode driving the vehicle 8 from the m6 mode to the m4 mode, the drive state control portion 136 once establishes the m7 mode having the fixed torque distribution ratio $R_x$, in which state the drive state control portion 136 switches the power source from the first power source PU1 to the second power source PU2 to establish the m4 mode having the fixed torque distribution ratio $R_x$.

When switching the power source driving the vehicle 8 from the first power source PU1 to the second power source PU2, if the torque increase of the second power source PU2 delays with respect to the torque reduction of the first power source PU1, temporary drop of the drive torque $T_r$ may possibly occur.

Thus, when switching the power source driving the vehicle 8 from the first power source PU1 to the second power source PU2, the drive state control portion 136 reduces torque of the first power source PU1 depending on increase in torque of the second power source PU2. That is, when switching the power source driving the vehicle 8 from the first power source PU1 to the second power source PU2, the drive state control portion 136 issues a control command signal for switching the running mode from the engine running using the first power source PU1 (esp., the engine 12) to the motor running using the TF rotator MGF. At this time, for example, the drive state control portion 136 issues the MGF control command signal $S_{mgf}$ for increasing the MGF torque $T_{mgf}$ toward the demanded value of the MGF torque $T_{mgf}$ achieving the demanded driving power $P_{rdem}$ and issues the engine control command signal $S_e$ for reducing the engine torque $T_e$ toward zero depending on increase in the MGF torque $T_{mgf}$ to stop the engine 12.

The drive mode determination portion 136a determines whether the current running drive mode is the m6 mode. The drive mode determination portion 136a further determines whether switch from the m6 mode to the m4 mode has been determined during running in the m6 mode.

If it is determined by the drive mode determination portion 136a that switch from the m6 mode to the m4 mode has been determined, the drive state control portion 136 issues the oil pressure control command signal $S_{cbf}$ for switching the TF clutch CF1 to engaged state while keeping the switching clutch CD1 engaged.

The switching completion determination portion 136b determines whether switch of the TF clutch CF1 to the engaged state has been completed. That is, the switching completion determination portion 136b determines whether switch from the m6 mode to the m7 mode has been completed.

If it is determined by the switching completion determination portion 136b that switch of the TF clutch CF1 to the engaged state has been completed, the drive state control portion 136 issues a control command signal for activating torque of the second power source PU2 and reducing torque of the first power source PU1 depending on increase in torque of the second power source PU2.

The switching completion determination portion 136b determines whether switch of the power source from the first power source PU1 to the second power source PU2 has been completed. In other words, the switching completion determination portion 136b determines whether switch from the m7 mode to the m4 mode has been completed.

Figure 10:
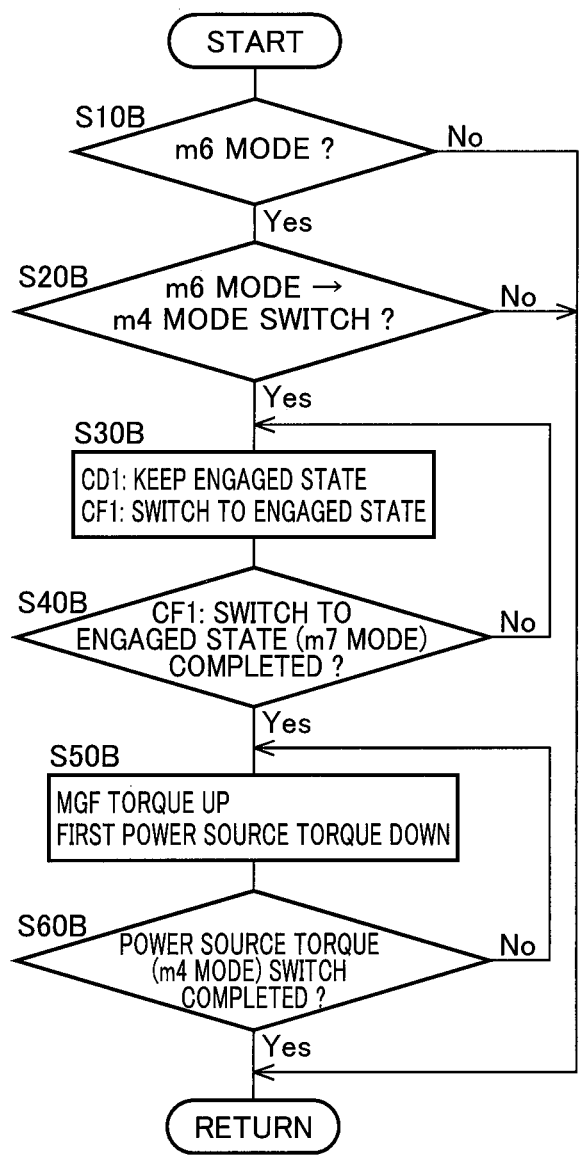
FIG. 10 is a flowchart explaining a principal part of control operation of the electronic control device and is a flowchart explaining control operation for suppressing deterioration in the running stability upon switching of the drive mode involving the power source switching.

FIG. 10 is a flowchart explaining a principal part of control operation of the electronic control device 130 and is a flowchart explaining control operation for suppressing deterioration in the running stability upon switching of the drive mode involving the power source switching, in which steps are repeatedly executed. FIG. 10 shows an example different from the flowchart of FIG. 9.

Referring to FIG. 10, first, at S10B corresponding to the function of the drive mode determination portion 136a, it is determined whether the current running drive mode is the m6 mode. If determination at S10B is negative, this routine comes to an end. If determination at S10B is affirmative, at S20B corresponding to the function of the drive mode determination portion 136a, it is determined whether switch from the m6 mode to m4 mode has been determined. If determination at S20B is negative, this routine terminates. If determination at S20B is affirmative, at S30B corresponding to the function of the drive state control portion 136, the oil pressure control command signal $S_{cbf}$ is issued that switches the TF clutch CF1 to engaged state while keeping the switching clutch CD1 engaged. In other words, the oil pressure control command signal $S_{cbf}$ is issued that switches the drive mode to the m7 mode, i.e., the AWD state having fixed torque distribution ratio $R_x$ with the differential device 64 diff-locked. Next, at S40B corresponding to the function of the switching completion determination portion 136b, it is determined whether switch of the TF clutch CF1 to the engaged state has been completed. If determination at S40B is negative, the procedure goes back to S30B. If determination at S40B is affirmative, at S50B corresponding to the function of the drive state control portion 136, there are issued the MGF control command signal $S_{mgf}$ for activating and increasing the MGF torque $T_{mgf}$ and the engine control command signal $S_e$ for reducing torque of the first power source PU1, e.g., the engine torque $T_e$ depending on increase in the MGF torque $T_{mgf}$. That is, control command signals for switch to the m4 mode are issued. Next, at S60B corresponding to the function of the switching completion determination portion 136b, it is determined whether switch of the power source from the first power source PU1 to the second power source PU2 has been completed. If determination at S60B is negative, the procedure goes back to S50B described above. If determination at S60B is affirmative, this routine comes to an end.

As above, according to this embodiment, when the drive mode is switched from the m6 mode to the m4 mode, the power source is switched with the torque distribution ratio $R_x$ fixed since the power source is switched from the first power source PU1 to the second power source PU2, after switching the TF clutch CF1 from slip state to engaged state while keeping the switching clutch CD1 engaged. This prevents the torque distribution ratio $R_x$ from changing due to the power source switching. In consequence, deterioration in the running stability can be suppressed upon switching of the drive mode involving the power source switching.

According to this embodiment, since upon switching the power source from the first power source PU1 to the second power source PU2, torque of the first power source PU1 is reduced depending on increase in torque of the second power source PU2, drop in the drive torque $T_r$ due to power source switching can be suppressed.

Third Embodiment

Figure 11:
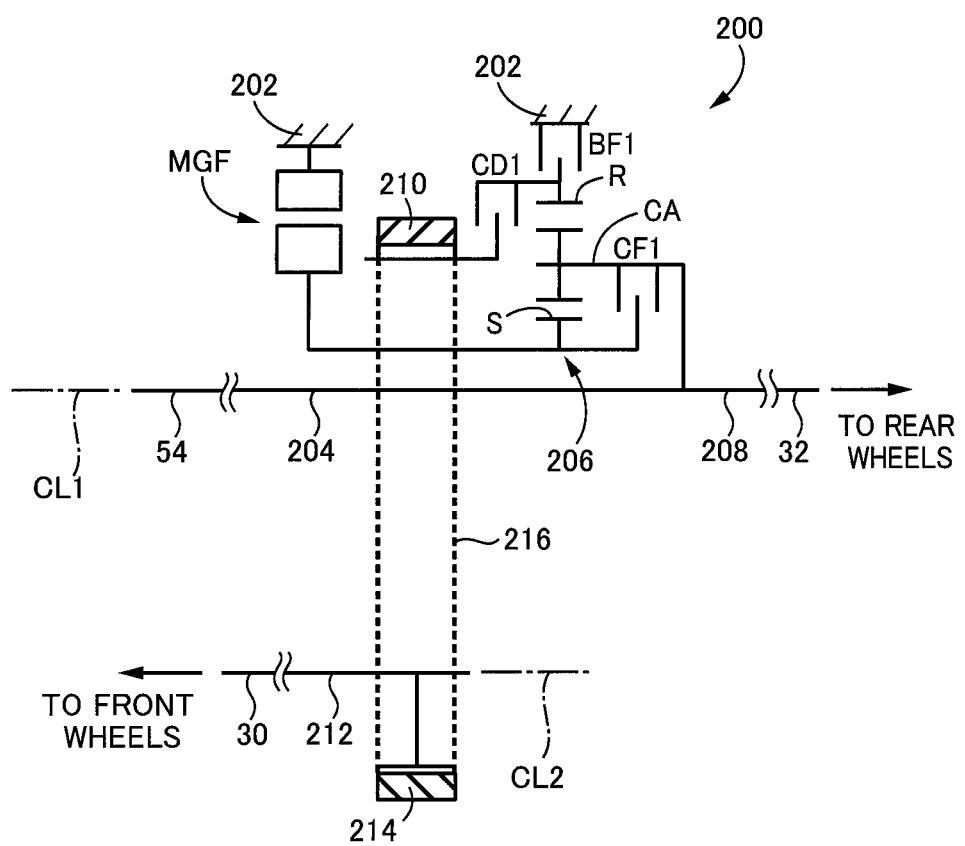
FIG. 11 is a diagram explaining a schematic configuration of a transfer corresponding to another embodiment of the invention, which is different from the transfer of FIG. 4.

FIG. 11 is a diagram explaining a schematic configuration of a transfer 200 different from the transfer 28 of FIG. 4 in the above embodiments, the transfer 200 being substituted for the transfer 28 in the drive apparatus for vehicle 10. Referring to FIG. 11, the transfer 200 includes a TF input shaft 204, a differential device 206, a first output shaft 208, the TF clutch CF1, the TF brake BF1, the switching clutch CD1, a first sprocket 210, etc., which are arranged on the common rotation axis CL1 within a transfer case 202 that is a non-rotating member (fixed member). The transfer 200 includes a second output shaft 212, a second sprocket 214, etc., which are arranged on the common rotation axis CL2 within the transfer case 202. The transfer 200 includes the TF rotator MGF, a chain 216, etc., within the transfer case 202. The TF rotator MGF, the differential device 206, the TF clutch CF1, the TF brake BF1, the switching clutch CD1, and the first sprocket 210 are configured substantially symmetrically with respect to the rotation axis CL1, with their lower halves with respect to the rotation axis CL1 not shown in FIG. 11. The second sprocket 214 is configured substantially symmetrically with respect to the rotation axis CL2, with its upper half with respect to the rotation axis CL2 not shown in FIG. 11. In the transfer 202, the rotation axis CL2 is a center axis of the second output shaft 212, the front propeller shaft 30, etc.

The chain 216 is a member that is passed around the first sprocket 210 and the second sprocket 214 to couple them together. In other words, the first sprocket 210 and the second sprocket 214 are connected to each other via the chain 216 in a power transmittable manner.

The TF input shaft 204 is coupled to the transmission output shaft 54 in a power transmittable manner. The first output shaft 208 is coupled to the rear propeller shaft 32 in a power transmittable manner. The TF input shaft 204 and the first output shaft 208 are integrally coupled to each other. This allows power from the first power source PU1 to be input via the automatic transmission 50, etc., to the first output shaft 208. Power input to the first output shaft 208 is transmitted via the rear propeller shaft 32, etc., to the rear wheels 16. The first output shaft 208 is a first output rotating member that receives power from the first power source PU1 and that outputs power to the rear wheels 16 as one wheels of the front wheels 14 and the rear wheels 16. The TF input shaft 204 and the first output shaft 208 may be a single rotating shaft.

The second output shaft 212 is coupled to the front propeller shaft 30 in a power transmittable manner. This allows power input to the second output shaft 212 to be transmitted via the front propeller shaft 30, etc., to the front wheels 14. The second output shaft 212 is a second output rotating member that outputs power to the front wheels 14 as the other wheels of the front wheels 14 and the rear wheels 16. The second sprocket 214 is secured to the second output shaft 212 in a relatively non-rotatable manner.

The differential device 206 is composed of a single-pinion type planetary gear drive and includes a sun gear S, a carrier CA, and a ring gear R. The TF rotator MGF is connected to the sun gear S in a power transmittable manner. The carrier CA is connected to the TF input shaft 204 and the first output shaft 208. The ring gear R is selectively connected via the TF brake BF1 to the transfer case 202. The ring gear R is selectively connected via the switching clutch CD1 to the first sprocket 210. The sun gear S and the carrier CA are selectively connected to each other via the TF clutch CF1.

Figure 12:
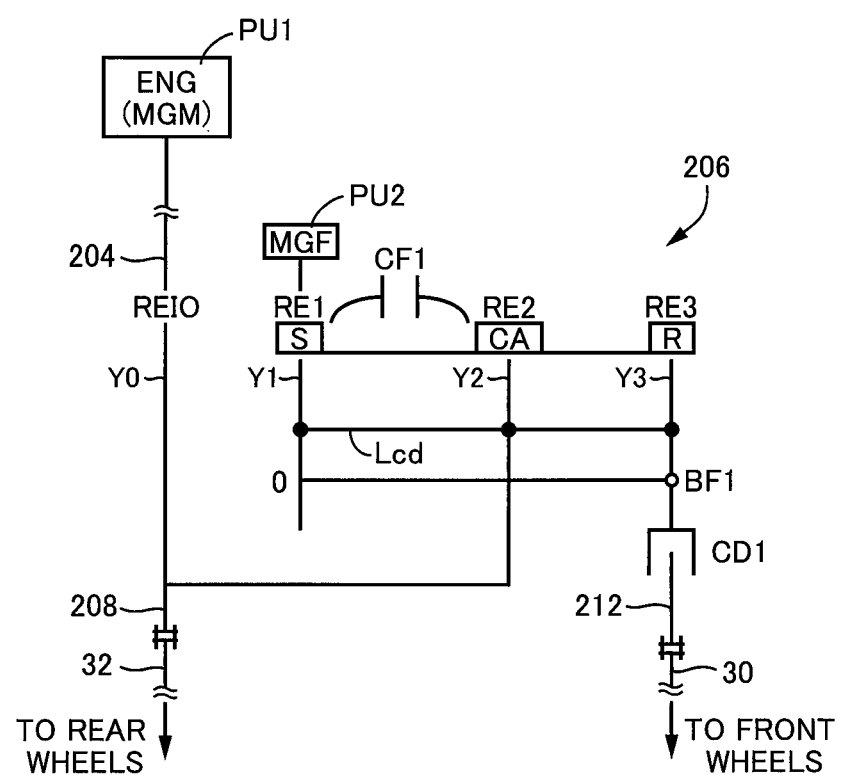
FIG. 12 is a collinear diagram representing relative relationships of rotation number among the rotary elements of the transfer in FIG. 11.

FIG. 12 is a collinear diagram representing relative relationships of rotation number among the rotary elements of the transfer 200. In FIG. 12, three vertical lines Y1, Y2, and Y3 corresponding to the three rotary elements of the differential device 206 constituting the transfer 200 are axes representing, respectively, in order from the left, the rotation number of the sun gear S corresponding to the first rotary element RE1, the rotation number of the carrier CA corresponding to the second rotary element RE2, and the rotation number of the ring gear R corresponding to the third rotary element RE3. A vertical line Y0 shown on the left side with respect to the vertical line Y1 is an axis representing the rotation number of the TF input shaft 204 and the first output shaft 208 that correspond to the input/output rotary element REIO.

If expressed using the collinear diagram of FIG. 12, in the transfer 200, the input/output rotary element REIO is coupled to the carrier CA and the rear propeller shaft 32. The first power source PU1 is coupled via the hybrid transmission 26 to the input/output rotary element REIO in a power transmittable manner.

In the differential device 206, the TF rotator MGF is connected to the first rotary element RE1 in a power transmittable manner. The first output shaft 208 as one output rotating member of the first output shaft 208 and the second output shaft 212 is connected to the second rotary element RE2. The third rotary element RE3 is selectively connected via the switching clutch CD1 to the second output shaft 212 and is selectively connected via the TF brake BF1 to the transfer case 202. The switching clutch CD1 is the first engagement device that selectively connects the third rotary element RE3 and the second output shaft 212 as the other output rotating member of the first output shaft 208 and the second output shaft 212. The first rotary element RE1 and the second rotary element RE2 are selectively connected to each other via the TF clutch CF1. The TF clutch CF1 is the second engagement device that selectively connects any two of the first rotary element RE1, the second rotary element RE2, and the third rotary element RE3. In the differential device 206, the straight line $L_{cd}$ represents mutual relationships of rotation number among the first rotary element RE1, the second rotary element RE2, and the third rotary element RE3.

The differential device 206 functions as the gear shift device that selectively forms the high gear stage with the engaged TF clutch CF1 and the low gear stage with the engaged TF brake BF1.

The differential device 206 functions as the center differential. Specifically, when the TF clutch CF1 and TF brake BF1 are both released, the differential device 206 is allowed to exert its differential action. In this state, the differential device 206 can distribute torque from the first power source PU1 input to the second rotary element RE2, to the third rotary element RE3 due to reaction torque of the TF rotator MGF coupled to the first rotary element RE1. Instead of applying reaction torque of the TF rotator MGF, the differential device 206 may distribute torque from the first power source PU1 input to the second rotary element RE2, to the third rotary element RE3 by slipping or engaging the TF clutch CF1 to limit the differential action of the differential device 206. At this time, when the switching clutch CD1 is engaged or slipping in the transfer 200, torque distributed to the third rotary element RE3 is transmitted to the second output shaft 212. In this manner, the transfer 200 is the torque distribution device that distributes a part of torque from the first power source PU1 input to the first output shaft 208, to the second output shaft 212. This allows the transfer 200 to distribute torque to the front wheels 14 and the rear wheels 16.

FIG. 13 is an operation engagement table explaining relationships between modes established in the transfer 200 and the control states of the engagement devices in the transfer 200. In FIG. 13, "○" represents the engaged state, blank represents the released state, and "○slip control" represents that a corresponding engagement device is slip-controlled. FIG. 13 differs from the operation engagement table of FIG. 6 in that the BEV (FF) high mode of No. m1 turns to BEV (FR) high mode (corresponding to the m1 mode), whereas the BEV (FF) low mode turns to BEV (FR) low mode (corresponding to m2 mode). Another difference is that in the first power source torque split mode of No. m5, the TF rotator MGF performs regenerative operation instead of power running operation. The other modes are basically not much different from the above embodiments, and hence description thereof will be omitted.

The BEV (FR) high mode of No. m1 and the BEV (FR) low mode are each a BEV drive mode in which the vehicle 8 is driven by the TF rotator MGF. Since the switching clutch CD1 is released in the BEV (FR) high mode and the BEV (FR) low mode, power transmission is cut off between the differential device 206 and the front wheels 14. With this state, in the differential device 206 forming the high gear stage by engagement of the TF clutch CF1 or the low gear stage by engagement of the TF brake BF1, power from the TF rotator MGF is transmitted via the first output shaft 208 to the rear wheels 16 side. Accordingly, the BEV running of this embodiment is implemented by the rear-wheel drive running.

The first power source torque split mode of No. m5 is a mode in which, for example, with the differential device 206 equivalent to the high gear stage, torque from the first power source PU1 transmitted from the first output shaft 208 to the differential device 206 is distributed to the front wheels 14 and the rear wheels 16 at any desired ratio that depends on reaction torque of the TF rotator MGF, by allowing the sun gear S to accept the torque of the first power source PU1 by the reaction torque of the TF rotator MGF. In the first power source torque split mode of the transfer 200, the TF rotator MGF is regenerated. Electric power generated by regeneration of the TF rotator MGF is charged into the battery 24 for example. Since in this manner, the TF rotator MGF performs regenerative action in the first power source torque split mode, the transfer 200 of this embodiment cannot carry out running mode in which electric power generated by the TM rotator MGM is supplied, as electric power upon power running of the TF rotator MGF, using the electrical path together in the first power source torque split mode.

Also in the transfer 200 configured as above, similarly to the above first and second embodiments, when switching the drive mode between the m4 mode and the m6 mode, the power source is switched so that the drive mode is switched between the m4 mode and the m7 mode which have the fixed torque distribution ratio $R_x$, whereby deterioration in the running stability can be suppressed upon switching of the drive mode involving the power source switching.

Fourth Embodiment

Figure 14:
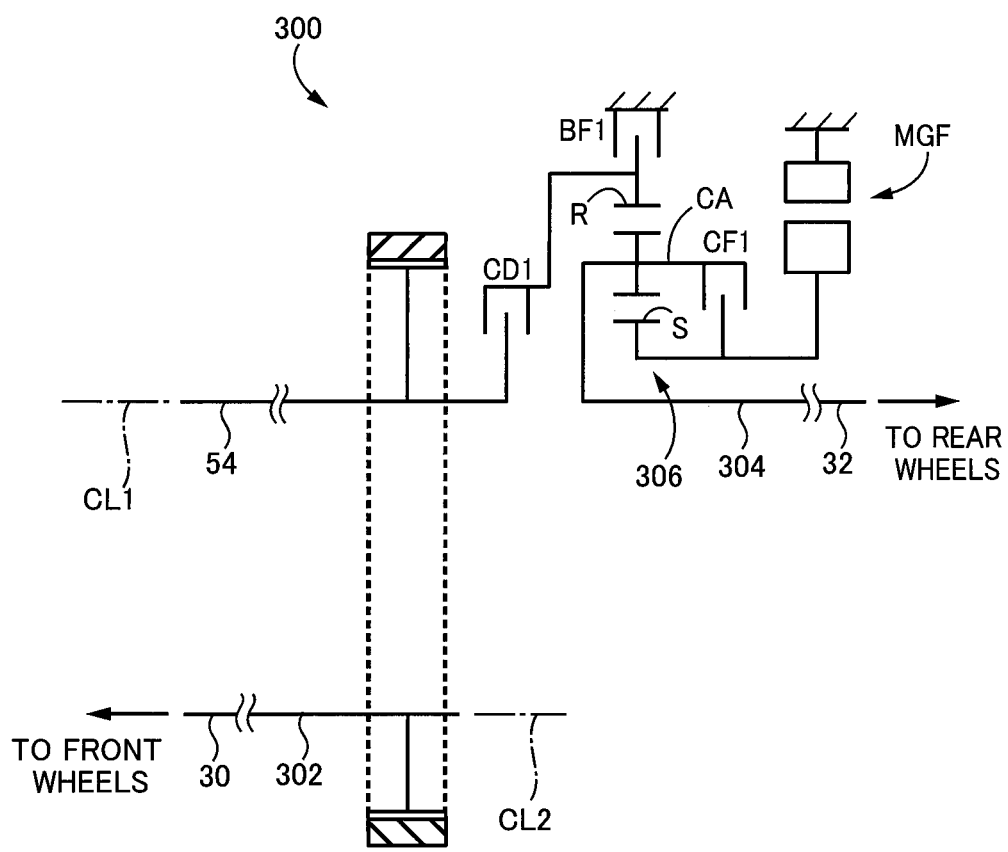
FIG. 14 is a diagram explaining a schematic configuration of a transfer different from the transfer in the other embodiments, and shows a different example from the transfer in FIG. 4.

FIG. 14 is a diagram explaining a schematic configuration of a transfer 300 different from the transfer of FIG. 4 in the above embodiments, the transfer 300 being substituted for the transfer 28 in the drive apparatus for vehicle 10. The transfer 200 of this embodiment differs from the transfer 28 shown in FIG. 4 in that a first output shaft 208 as a first output rotating member receiving power from the first power source PU1 and outputting power to one wheels of the front wheels 14 and the rear wheels 16 is connected via the front propeller shaft 30, etc., to the front wheels 14 in a power transmittable manner and in that a second output shaft 304 as a second output rotating member outputting power to the other wheels of the front wheels 14 and the rear wheels 16 is connected via the rear propeller shaft 32, etc., to the rear wheels 16 in a power transmittable manner. In this embodiment, therefore, one wheels of the front wheels 14 and the rear wheels 16 are the front wheels 14, while the other wheels are rear wheels 16. Specific coupling relationships of a differential device 306 are substantially unchanged from those of the differential device 64. That is, the transfer 300 is basically unchanged from the transfer 28 except that the transfer 300 is equivalent to the mode in which the front wheels 14 and the rear wheels 16 are interchanged with each other in the transfer 28. The structure of the transfer 300 is fundamentally unchanged from the transfer 28 described above, and hence detailed description thereof will be omitted.

Figure 15:
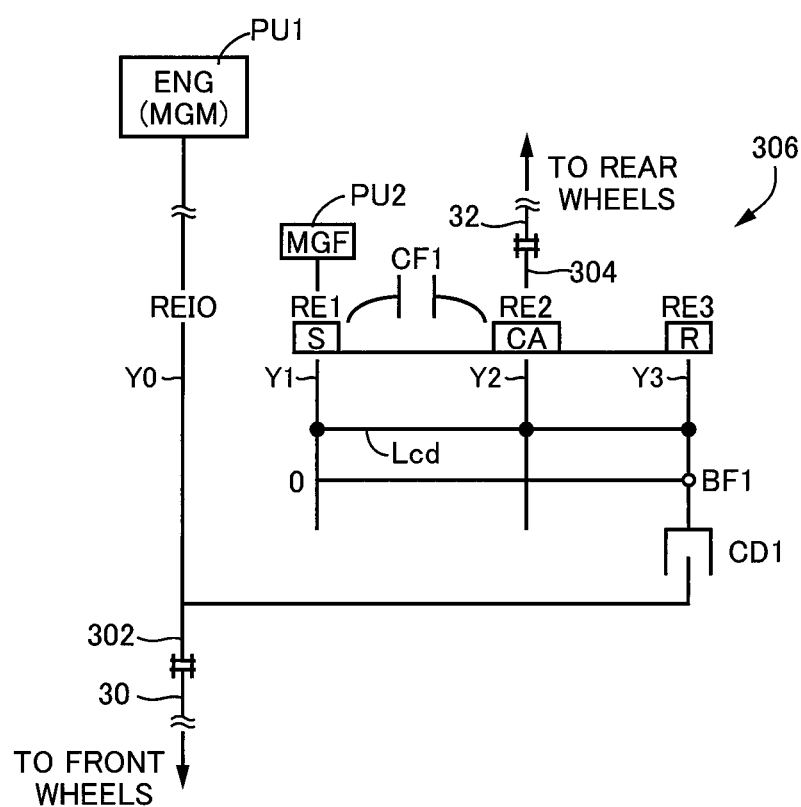
FIG. 15 is a collinear diagram representing relative relationships of rotation number among the rotary elements of the transfer in FIG. 14.

FIG. 15 is a collinear diagram representing relative relationships of rotation number among the rotary elements of the transfer 300. The collinear diagram of FIG. 15 is substantially unchanged from that of FIG. 5 of the above embodiments except that the front wheels 14 and the rear wheels 16 are merely interchanged in arrangement position with each other, and hence detailed description thereof will be omitted. One output rotating member of a first output shaft 302 and a second output shaft 304 is the second output shaft 304, while the other output rotating member is the first output shaft 302.

FIG. 16 is an operation engagement table explaining relationships between modes established in the transfer 300 and the control states of the engagement devices in the transfer 300. The operation engagement table of FIG. 16 differs from that of FIG. 6 of the embodiment described above only in that the BEV (FF) high mode of No. m1 and the BEV (FF) low mode of No. m2 turn to BEV (FR) high mode and the BEV (FR) low mode, respectively, and in that the first power source two-wheel drive (FR) mode of No. m8 turns to the first power source two-wheel drive (FF) mode. That is, in the transfer 300, the drive states of the front wheels 14 and the rear wheels 16 of each mode are simply interchanged with those of the front wheels 14 and the rear wheels 16 in the transfer 28, and hence detailed description of FIG. 16 will be omitted.

Also in the transfer 300 configured as above, similarly to the above first and second embodiments, when switching the drive mode between the m3 mode and the m7 mode, the power source is switched so that the drive mode is switched between the m4 mode and the m7 mode which have the fixed torque distribution ratio $R_x$, whereby deterioration in the running stability can be suppressed upon switching of the drive mode involving the power source switching.

Fifth Embodiment

Figure 17:
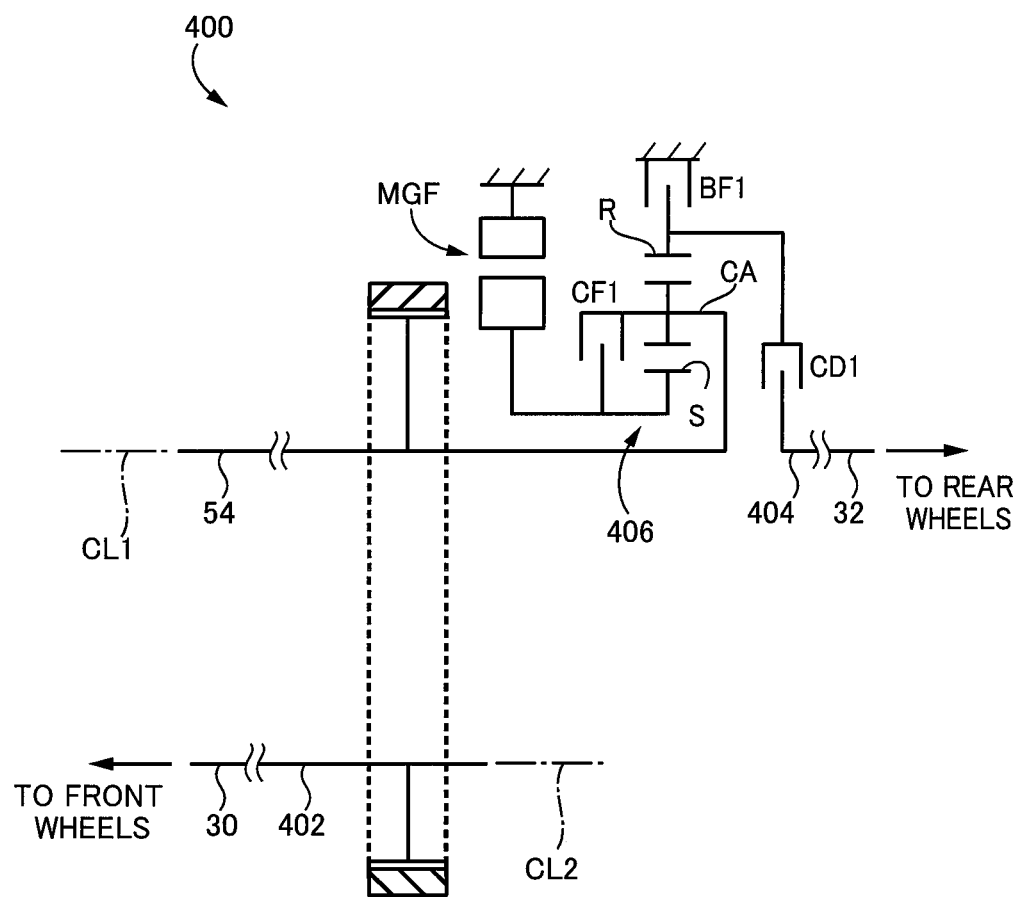
FIG. 17 is a diagram explaining a schematic configuration of a transfer corresponding to other embodiments of the invention which is different from the transfer in FIG. 4.

FIG. 17 is a diagram explaining a schematic configuration of a transfer 400 different from the transfer of FIG. 4 in the above embodiments, the transfer 400 being substituted for the transfer 28 in the drive apparatus for vehicle 10. The transfer 400 of this embodiment differs from the transfer 200 shown in FIG. 11 in that a first output shaft 402 as a first output rotating member receiving power from the first power source PU1 and outputting power to one wheels of the front wheels 14 and the rear wheels 16 is connected via the front propeller shaft 30, etc., to the front wheels 14 in a power transmittable manner and in that a second output shaft 404 as a second output rotating member outputting power to the other wheels of the front wheels 14 and the rear wheels 16 is connected via the rear propeller shaft 32, etc., to the rear wheels 16 in a power transmittable manner. In this embodiment, therefore, one wheels of the front wheels 14 and the rear wheels 16 are the front wheels 14, while the other wheels are rear wheels 16. Specific coupling relationships of a differential device 406 are substantially unchanged from those of the differential device 206 of FIG. 11. That is, the transfer 400 is basically unchanged from the transfer 200 except that the transfer 400 is equivalent to the mode in which the front wheels 14 and the rear wheels 16 are interchanged with each other in the transfer 200. In this manner, the structure of the transfer 400 is fundamentally unchanged from the transfer 200 described above, and hence detailed description thereof will be omitted.

Figure 18:
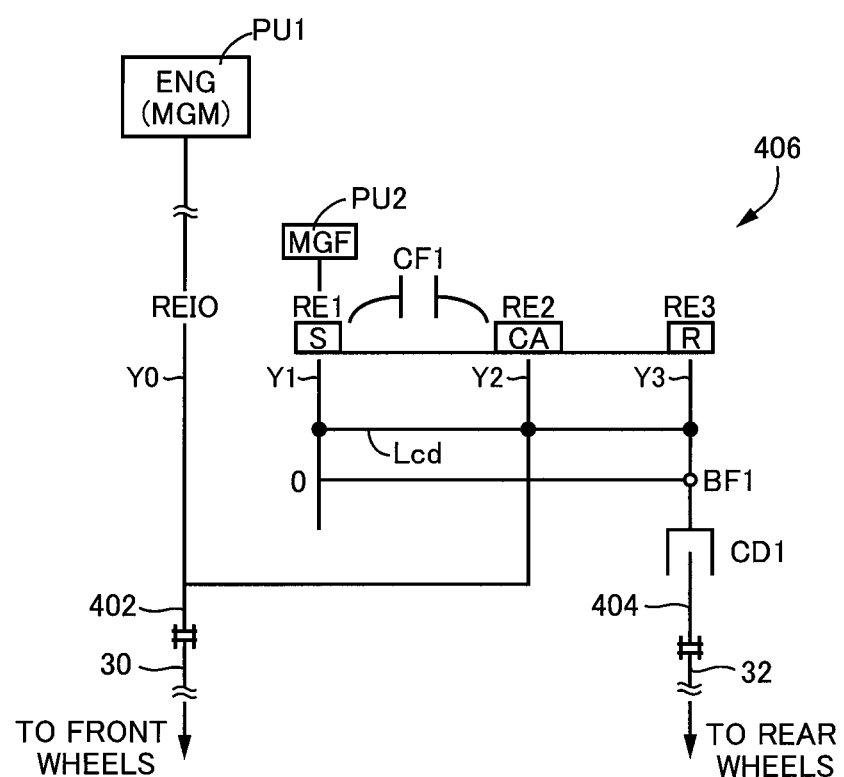
FIG. 18 is a collinear diagram representing relative relationships of rotation number among the rotary elements of the transfer in FIG. 17.

FIG. 18 is a collinear diagram representing relative relationships of rotation number among the rotary elements of the transfer 400. The collinear diagram of FIG. 18 is substantially unchanged from that of FIG. 12 of the above embodiment except that the front wheels 14 and the rear wheels 16 are merely interchanged in arrangement position with each other, and hence detailed description thereof will be omitted. One output rotating member of the first output shaft 402 and the second output shaft 404 is the first output shaft 402, while the other output rotating member is the second output shaft 404.

FIG. 19 is an operation engagement table explaining relationships between modes established in the transfer 400 and the control states of the engagement devices in the transfer 400. The operation engagement table of FIG. 19 differs from that of FIG. 13 of the embodiment described above only in that the BEV (FR) high mode of No. m1 and the BEV (FR) low mode of No. m2 turn to BEV (FF) high mode and the BEV (FF) low mode, respectively, and in that the first power source two-wheel drive (FR) mode of No. m8 turns to the first power source two-wheel drive (FF) mode. That is, in the transfer 400, the drive states of the front wheels 14 and the rear wheels 16 in each mode are simply interchanged with those of the front wheels 14 and the rear wheels 16 in the transfer 200, and hence detailed description of FIG. 19 will be omitted.

Also in the transfer 400 configured as above, similarly to the above first and second embodiments, when switching the drive mode between the m4 mode and the m6 mode, the power source is switched so that the drive mode is switched between the m4 mode and the m7 mode which have the fixed torque distribution ratio $R_x$, whereby deterioration in the running stability can be suppressed upon switching of the drive mode involving the power source switching.

Although the embodiments of the present invention have hereinabove been described in detail, the present invention is applicable also to other modes.

For example, the above first and second embodiments may be carried out solely or may be combined together.

In the above embodiments, the transfers 28, 200, 300, and 400 need only include at least the switching clutch CD1 and the TF clutch CF1, of the switching clutch CD1, the TF clutch CF1, and the TF brake BF1. The TF clutch CF1 may be any clutch that selectively connects any two of the first rotary element RE1, the second rotary element RE2, and the third rotary element RE3, such as a clutch that selectively connects the first rotary element RE1 and the third rotary element RE3 of the differential devices 64, 206, 306, and 406.

Although in the above embodiments the sun gear S of the differential devices 64, 206, 306, and 406 functions as the first rotary element RE1, with the carrier CA and the ring gear R functioning as the second rotary element RE2 and the third rotary element RE3, respectively, the present invention is not necessarily limited thereto. For example, the first rotary element RE1 may be either one of the carrier CA or the ring gear R, and the second rotary element RE2 and the third rotary element RE3 may also appropriately be changed. In other words, the coupling relationships in the differential devices 64, 206, 306, and 406 may appropriately be changed within a compatible range. Although the TF rotator MGF is directly coupled to the sun gear S of the differential devices 64, 206, 306, and 406, a speed reducer or a speed increaser may be interposed between the TF rotator MGF and the sun gear S of the differential device 64. The differential devices 64, 206, 306, and 406 need not be composed of the planetary gear drives and may be composed of a differential mechanism having, e.g., three rotary elements and capable of exerting the differential action.

In the above embodiments, the first power source PU1 may include at least one of the engine 12 and the TM rotator MGM. For example, in case that the first power source PU1 consists of only the TM rotator MGM, or in case that there is disposed a clutch capable of disconnecting the engine 12 from the power transmission path, the torque converter 48 and the automatic transmission 50 need not necessarily be arranged. The automatic transmission 50 may be a synchromesh type parallel dual-axis automatic transmission including a publicly known dual clutch transmission (DCT), or may be a publicly known belt-type stepless transmission. The torque converter 48 may be substituted by other hydrodynamic power transmitting device such as a fluid coupling having no torque amplification effect, or may be replaced with a mere clutch. The second power source PU2 may include the engine in addition to the TF rotator MGF, or may include the engine in place of the TF rotator MGF.

Although in the above embodiments, the drive apparatus for vehicle 10 is of the longitudinal mounted type where the crankshaft of the engine 12 and the rotation axis CL1 of the automatic transmission 50 and the transfers 28, 200, 300, and 400 are parallel to the travelling direction of the vehicle 8, the present invention is not necessarily limited thereto. For example, the drive apparatus for vehicle may be of the transverse mounted type where the crankshaft of the engine 12, the rotation axis of the automatic transmission 50, and the rotation axis of the transfers 28, 200, 300, and 400 are each arranged in the width direction of the vehicle.

It is to be understood that the above are mere embodiments and that the present invention can be carried out in modes variously altered or modified based on the knowledge of those skilled in the art.

What is claimed is:

1. A drive apparatus for vehicle comprising:
a first power source;
a first output rotating member receiving power from the first power source and outputting power to one of a set of wheels of either front wheels and rear wheels;
a second output rotating member outputting power to the other set of wheels of the front wheels and the rear wheels;
a second power source;
a differential device having a first rotary element to which the second power source is connected, a second rotary element to which one of the first output rotating member and the second output rotating member is connected, and a third rotary element;
a first engagement device selectively connecting the third rotary element and the other of the first output rotating member and the second output rotating member;
a second engagement device selectively connecting any two of the first rotary element, the second rotary element, and the third rotary element, and
a control device,
the control device establishing, as drive modes driving a vehicle, a first drive mode putting the vehicle in all-wheel drive state by power from the second power source while fixing a torque distribution ratio between the front wheels and the rear wheels with both the first engagement device and the second engagement device kept in engaged state, and a second drive mode controlling the torque distribution ratio by putting the vehicle in all-wheel drive state by power from the first power source while controlling the second engagement device to be in slip state with the first engagement device kept in engaged state, when switching the drive mode from the first drive mode to the second drive mode, the second engagement device is switched from the engaged state to the slip state, while keeping the first engagement device engaged, after switching the power source driving the vehicle from the second power source to the first power source.

2. The drive apparatus for vehicle of claim 1, wherein when switching the power source from the second power source to the first power source, the control device reduces torque of the second power source depending on increase in torque of the first power source.

3. A drive apparatus for vehicle comprising:

a first power source;

a first output rotating member receiving power from the first power source and outputting power to one of a set of wheels of either front wheels and rear wheels;

a second output rotating member outputting power to the other set of wheels of the front wheels and the rear wheels;

a second power source;

a differential device having a first rotary element to which the second power source is connected, a second rotary element to which one of the first output rotating member and the second output rotating member is connected, and a third rotary element;

a first engagement device selectively connecting the third rotary element and the other of the first output rotating member and the second output rotating member;

a second engagement device selectively connecting any two of the first rotary element, the second rotary element, and the third rotary element, and a control device, the control device establishing, as drive modes driving a vehicle, a first drive mode putting the vehicle in all-wheel drive state by power from the second power source while fixing a torque distribution ratio between the front wheels and the rear wheels with both the first engagement device and the second engagement device kept in engaged state, and a second drive mode controlling the torque distribution ratio by putting the vehicle in all-wheel drive state by power from the first power source while controlling the second engagement device to be in slip state with the first engagement device kept in engaged state, when switching the drive mode from the second drive mode to the first drive mode, after switching the second engagement device from slip state to engaged state while keeping the first engagement device in engaged state, the control device switches the power source driving the vehicle from the first power source to the second power source.

4. The drive apparatus for vehicle of claim 3, wherein when switching the power source from the first power source to the second power source, the control device reduces torque of the first power source depending on increase in torque of the second power source.

* * * * *